US011330455B2

(12) United States Patent
Nam et al.

(10) Patent No.: US 11,330,455 B2
(45) Date of Patent: May 10, 2022

(54) INDICATION OF PAUSE DURATION FOR UNLICENSED BAND OPERATION

(71) Applicant: QUALCOMM Incorporated, San Diego, CA (US)

(72) Inventors: Wooseok Nam, San Diego, CA (US); Tao Luo, San Diego, CA (US); Xiaoxia Zhang, San Diego, CA (US); Arumugam Chendamarai Kannan, San Diego, CA (US); Jing Sun, San Diego, CA (US); Olufunmilola Omolade Awoniyi-Oteri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 16/719,365

(22) Filed: Dec. 18, 2019

(65) Prior Publication Data

US 2020/0205020 A1 Jun. 25, 2020

Related U.S. Application Data

(60) Provisional application No. 62/784,178, filed on Dec. 21, 2018.

(51) Int. Cl.
*H04L 12/28* (2006.01)
*H04W 24/08* (2009.01)
(Continued)

(52) U.S. Cl.
CPC ......... *H04W 24/08* (2013.01); *H04L 41/0803* (2013.01); *H04W 16/14* (2013.01);
(Continued)

(58) Field of Classification Search
CPC .. H04L 41/0803; H04W 16/14; H04W 24/08; H04W 72/0453; H04W 74/0816; H04W 74/0808
(Continued)

(56) References Cited

U.S. PATENT DOCUMENTS 9,942,901 B2 * 4/2018 Chandrasekhar .......................... H04W 72/0453
2015/0063251 A1 3/2015 Asterjadhi
(Continued)

OTHER PUBLICATIONS

Anonymous: "ShareTechnote—LTE Quick Reference—DRX (Discontinuous Reception)—CDRX (Connected Mode DRX)", Nov. 29, 2018 (Nov. 29, 2018), XP055673531, pp. 40-50, Retrieved from the Internet: URL: https:/web.archive.org/web/20181129202238/https://www.sharetechnote.com/html/Handbook_LTE_DRX.html [retrieved-on Mar. 4, 2020], the whole document.
(Continued)

*Primary Examiner* — John Pezzlo
(74) *Attorney, Agent, or Firm* — Liem T. Do

(57) ABSTRACT

Methods, systems, and devices for wireless communications are described. A user equipment (UE) may receive signaling from a base station that identifies a set of channel monitoring parameters associated with monitoring an unlicensed frequency spectrum band, the channel monitoring parameters comprising a length of a pause duration between successive transmission opportunities. The UE may identify a termination of a transmission opportunity in the unlicensed frequency spectrum band. The UE may monitor the unlicensed frequency spectrum band following the termination of the transmission opportunity using the set of channel monitoring parameters.

26 Claims, 15 Drawing Sheets

(51) Int. Cl.
  *H04W 72/04* (2009.01)
  *H04L 41/0803* (2022.01)
  *H04W 76/30* (2018.01)
  *H04W 16/14* (2009.01)
  *H04J 1/16* (2006.01)
  *H04W 76/27* (2018.01)
(52) U.S. Cl.
  CPC ......... *H04W 72/042* (2013.01); *H04W 76/30* (2018.02); *H04W 72/0453* (2013.01); *H04W 76/27* (2018.02)
(58) Field of Classification Search
  USPC ................................ 370/252, 329, 386, 430
  See application file for complete search history.

(56) References Cited

U.S. PATENT DOCUMENTS

| | | | |
|---|---|---|---|
| 2019/0297579 A1 | 9/2019 | Bhattad et al. | |
| 2020/0245355 A1* | 7/2020 | Mueck | H04M 7/006 |
| 2021/0007101 A1* | 1/2021 | Tooher | H04W 24/02 |
| 2021/0282187 A1* | 9/2021 | Agiwal | H04W 74/008 |
| 2021/0328728 A1* | 10/2021 | El Hamss | H04L 5/0082 |

OTHER PUBLICATIONS

Ericsson: "On the Use of a Preamble for NR-U", 3GPP Draft, 3GPP TSG-RAN WG1 Meeting #95, R1-1814021 on the Use of a Preamble for NR-U Rev_Updatedtables, 3rd Generation Partnership Project (3GPP), Mobile Competence Centre, 650, Route Des Lucioles, F-06921 Sophia-Antipolis CED, vol. RAN WG1, No. Spokane, USA, Nov. 12, 2018-Nov. 16, 2018, Nov. 15, 2018 (Nov. 15, 2018), XP051494465, pp. 1-15, Retrieved from the Internet: URL: http://www.3gpp.org/ftp/tsg%5Fran/WG1%5FRL1/TSGR1%5F95/Docs/R1%2D1814021%2Ezip [retrieved on Nov. 15, 2018], Section 3, Section 3.1, pp. 5-6.
Hiertz G.R., et al., "The Evolution of Wireless LANs and PANs—Analysis of IEEE 802.11 E forqos Support in Wireless LANs," IEEE Personal Communications, IEEE Communications Society, US, vol. 10 (6), Dec. 1, 2003, pp. 40-50, XP011107079, ISSN: 1070-9916, DOI: 10.1109/MWC.2003.1265851.
International Search Report and Written Opinion—PCT/US2019/067393—ISA/EPO—dated Mar. 11, 2020.

* cited by examiner

INDICATION OF PAUSE DURATION FOR UNLICENSED BAND OPERATION

CROSS REFERENCE

The present Application for Patent claims the benefit of U.S. Provisional Patent Application No. 62/784,178 by NAM et al., entitled "INDICATION OF PAUSE DURATION FOR UNLICENSED BAND OPERATION," filed Dec. 21, 2018, assigned to the assignee hereof, and expressly incorporated herein.

BACKGROUND

The following relates generally to wireless communications, and more specifically to indication of pause duration for unlicensed band operation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as a user equipment (UE). The wireless multiple-access communications system may employ technologies that support licensed frequency spectrum band operation and unlicensed frequency spectrum band operation for the base stations, network access nodes, or UEs. In some cases, poor efficiency may result from operating in the unlicensed frequency spectrum.

SUMMARY

The described techniques relate to improved methods, systems, devices, and apparatuses that support indication of pause duration for unlicensed band operation. A communication device, which may be otherwise known as a user equipment (UE) may operate within an unlicensed frequency spectrum band in a wireless communications system. In some examples, when operating within an unlicensed frequency spectrum band, communications for the communication device may be subject to a transmission opportunity. Within the transmission opportunity, operating behaviors of the communication device may be similar to licensed frequency spectrum band operation. Outside the transmission opportunity, however, the communication device may monitor a communication channel to detect a transmission opportunity. In some examples, monitoring of the communication channel according to some techniques may result in inefficient use of resources. To improve efficiency of the monitoring of the communication channel and minimize use of resources of the communication device, it may be beneficial for the communication device to monitor the communication channel (e.g., an unlicensed frequency spectrum band) according to a set of received (or selected) channel monitoring parameters.

A method of wireless communications at a UE is described. The method may include receiving signaling from a base station that identifies a set of channel monitoring parameters associated with monitoring an unlicensed frequency spectrum band, the channel monitoring parameters including a length of a pause duration between successive transmission opportunities, identifying a termination of a transmission opportunity in the unlicensed frequency spectrum band, and monitoring the unlicensed frequency spectrum band following the termination of the transmission opportunity using the set of channel monitoring parameters.

An apparatus for wireless communications at a UE is described. The apparatus may include a processor, memory in electronic communication with the processor, and instructions stored in the memory. The instructions may be executable by the processor to cause the apparatus to receive signaling from a base station that identifies a set of channel monitoring parameters associated with monitoring an unlicensed frequency spectrum band, the channel monitoring parameters including a length of a pause duration between successive transmission opportunities, identify a termination of a transmission opportunity in the unlicensed frequency spectrum band, and monitor the unlicensed frequency spectrum band following the termination of the transmission opportunity using the set of channel monitoring parameters.

Another apparatus for wireless communications at a UE is described. The apparatus may include means for receiving signaling from a base station that identifies a set of channel monitoring parameters associated with monitoring an unlicensed frequency spectrum band, the channel monitoring parameters including a length of a pause duration between successive transmission opportunities, identifying a termination of a transmission opportunity in the unlicensed frequency spectrum band, and monitoring the unlicensed frequency spectrum band following the termination of the transmission opportunity using the set of channel monitoring parameters.

A non-transitory computer-readable medium storing code for wireless communications at a UE is described. The code may include instructions executable by a processor to receive signaling from a base station that identifies a set of channel monitoring parameters associated with monitoring an unlicensed frequency spectrum band, the channel monitoring parameters including a length of a pause duration between successive transmission opportunities, identify a termination of a transmission opportunity in the unlicensed frequency spectrum band, and monitor the unlicensed frequency spectrum band following the termination of the transmission opportunity using the set of channel monitoring parameters.

Some examples of the method, apparatuses, and non-transitory computer-readable medium described herein may further include operations, features, means, or instructions for receiving semi-static configuration signaling from the base station prior to the transmission opportunity, the semi-static configuration signaling configuring one or more sets of channel monitoring parameters, each channel monitoring set including a corresponding pause duration.

Some examples of the method, apparatuses, and non-transitory computer-readable medium described herein may further include operations, features, means, or instructions for receiving dynamic signaling during the transmission opportunity that includes a second set of channel monitoring parameters, the second set of channel monitoring parameters including a dynamically indicated pause duration between the transmission opportunity and a next transmission opportunity, selecting either the corresponding pause duration from a set of channel monitoring parameters of the one or more sets of channel monitoring parameters or the dynamically indicated pause duration, and monitoring the unlicensed frequency spectrum band based on the selected pause duration between the transmission opportunity and the next transmission opportunity.

Some examples of the method, apparatuses, and non-transitory computer-readable medium described herein may further include operations, features, means, or instructions for monitoring, based on the selected pause duration, the unlicensed frequency spectrum band for a number of successive transmission opportunities.

Some examples of the method, apparatuses, and non-transitory computer-readable medium described herein may further include operations, features, means, or instructions for transitioning to a sleep mode for a time period based on the pause duration.

In some examples of the method, apparatuses, and non-transitory computer-readable medium described herein, the signaling may be received from the base station during the transmission opportunity.

In some examples of the method, apparatuses, and non-transitory computer-readable medium described herein, the signaling may include operations, features, means, or instructions for a downlink control information (DCI) signaling, a medium access control (MAC) control element (CE), or a radio resource control (RRC) signaling.

In some examples of the method, apparatuses, and non-transitory computer-readable medium described herein, the signaling may include operations, features, means, or instructions for a common signaling, a group signaling, or a UE-specific signaling.

A method of wireless communications at a base station is described. The method may include determining a set of channel monitoring parameters associated with monitoring an unlicensed frequency spectrum band, the channel monitoring parameters including a length of a pause duration between successive transmission opportunities and transmitting signaling, to a UE in wireless communications with the base station, that identifies the set of channel monitoring parameters associated with monitoring the unlicensed frequency spectrum band.

An apparatus for wireless communications at a base station is described. The apparatus may include a processor, memory in electronic communication with the processor, and instructions stored in the memory. The instructions may be executable by the processor to cause the apparatus to determine a set of channel monitoring parameters associated with monitoring an unlicensed frequency spectrum band, the channel monitoring parameters including a length of a pause duration between successive transmission opportunities and transmit signaling, to a UE in wireless communications with the base station, that identifies the set of channel monitoring parameters associated with monitoring the unlicensed frequency spectrum band.

Another apparatus for wireless communications at a base station is described. The apparatus may include means for determining a set of channel monitoring parameters associated with monitoring an unlicensed frequency spectrum band, the channel monitoring parameters including a length of a pause duration between successive transmission opportunities and transmitting signaling, to a UE in wireless communications with the base station, that identifies the set of channel monitoring parameters associated with monitoring the unlicensed frequency spectrum band.

A non-transitory computer-readable medium storing code for wireless communications at a base station is described. The code may include instructions executable by a processor to determine a set of channel monitoring parameters associated with monitoring an unlicensed frequency spectrum band, the channel monitoring parameters including a length of a pause duration between successive transmission opportunities and transmit signaling, to a UE in wireless communications with the base station, that identifies the set of channel monitoring parameters associated with monitoring the unlicensed frequency spectrum band.

Some examples of the method, apparatuses, and non-transitory computer-readable medium described herein may further include operations, features, means, or instructions for identifying the pause duration based on one or more of a fairness metric associated with communicating on the unlicensed frequency spectrum band, a listen-before-talk (LBT) procedure performed on the unlicensed frequency spectrum band, a traffic metric associated with the unlicensed frequency spectrum band, or a combination thereof.

Some examples of the method, apparatuses, and non-transitory computer-readable medium described herein may further include operations, features, means, or instructions for transmitting semi-static configuration signaling to the UE prior to a transmission opportunity, the semi-static configuration signaling including configuring one or more sets of channel monitoring parameters, each channel monitoring set including a corresponding pause duration.

Some examples of the method, apparatuses, and non-transitory computer-readable medium described herein may further include operations, features, means, or instructions for transmitting dynamic signaling during the transmission opportunity that includes a second set of channel monitoring parameters, the second set of channel monitoring parameters including a dynamically indicated pause duration between the transmission opportunity and a next transmission opportunity.

In some examples of the method, apparatuses, and non-transitory computer-readable medium described herein, the dynamically indicated pause duration may be for a number of successive transmission opportunities.

In some examples of the method, apparatuses, and non-transitory computer-readable medium described herein, the signaling may be transmitted to the UE during the transmission opportunity.

In some examples of the method, apparatuses, and non-transitory computer-readable medium described herein, the signaling may include operations, features, means, or instructions for a DCI signaling, a MAC CE, or an RRC signaling.

In some examples of the method, apparatuses, and non-transitory computer-readable medium described herein, the signaling may include operations, features, means, or instructions for a common signaling, a group signaling, or a UE-specific signaling.

A method of wireless communications at a base station is described. The method may include receiving signaling from a base station that identifies a set of channel monitoring parameters associated with monitoring a control channel associated with an unlicensed frequency spectrum band, updating the set of channel monitoring parameters to an updated set of channel monitoring parameters based on an indication from the base station, identifying a termination of a transmission opportunity in the unlicensed frequency spectrum band, and monitoring the unlicensed frequency spectrum band following the termination of the transmission opportunity using the updated set of channel monitoring parameters.

An apparatus for wireless communications at a base station is described. The apparatus may include a processor, memory in electronic communication with the processor, and instructions stored in the memory. The instructions may be executable by the processor to cause the apparatus to receive signaling from a base station that identifies a set of channel monitoring parameters associated with monitoring a control channel associated with an unlicensed frequency spectrum band, update the set of channel monitoring parameters to an updated set of channel monitoring parameters based on an indication from the base station, identify a termination of a transmission opportunity in the unlicensed frequency spectrum band, and monitor the unlicensed frequency spectrum band following the termination of the transmission opportunity using the updated set of channel monitoring parameters.

Another apparatus for wireless communications at a base station is described. The apparatus may include means for receiving signaling from a base station that identifies a set of channel monitoring parameters associated with monitoring a control channel associated with an unlicensed frequency spectrum band, updating the set of channel monitoring parameters to an updated set of channel monitoring parameters based on an indication from the base station, identifying a termination of a transmission opportunity in the unlicensed frequency spectrum band, and monitoring the unlicensed frequency spectrum band following the termination of the transmission opportunity using the updated set of channel monitoring parameters.

A non-transitory computer-readable medium storing code for wireless communications at a base station is described. The code may include instructions executable by a processor to receive signaling from a base station that identifies a set of channel monitoring parameters associated with monitoring a control channel associated with an unlicensed frequency spectrum band, update the set of channel monitoring parameters to an updated set of channel monitoring parameters based on an indication from the base station, identify a termination of a transmission opportunity in the unlicensed frequency spectrum band, and monitor the unlicensed frequency spectrum band following the termination of the transmission opportunity using the updated set of channel monitoring parameters.

DETAILED DESCRIPTION

Figure 1:
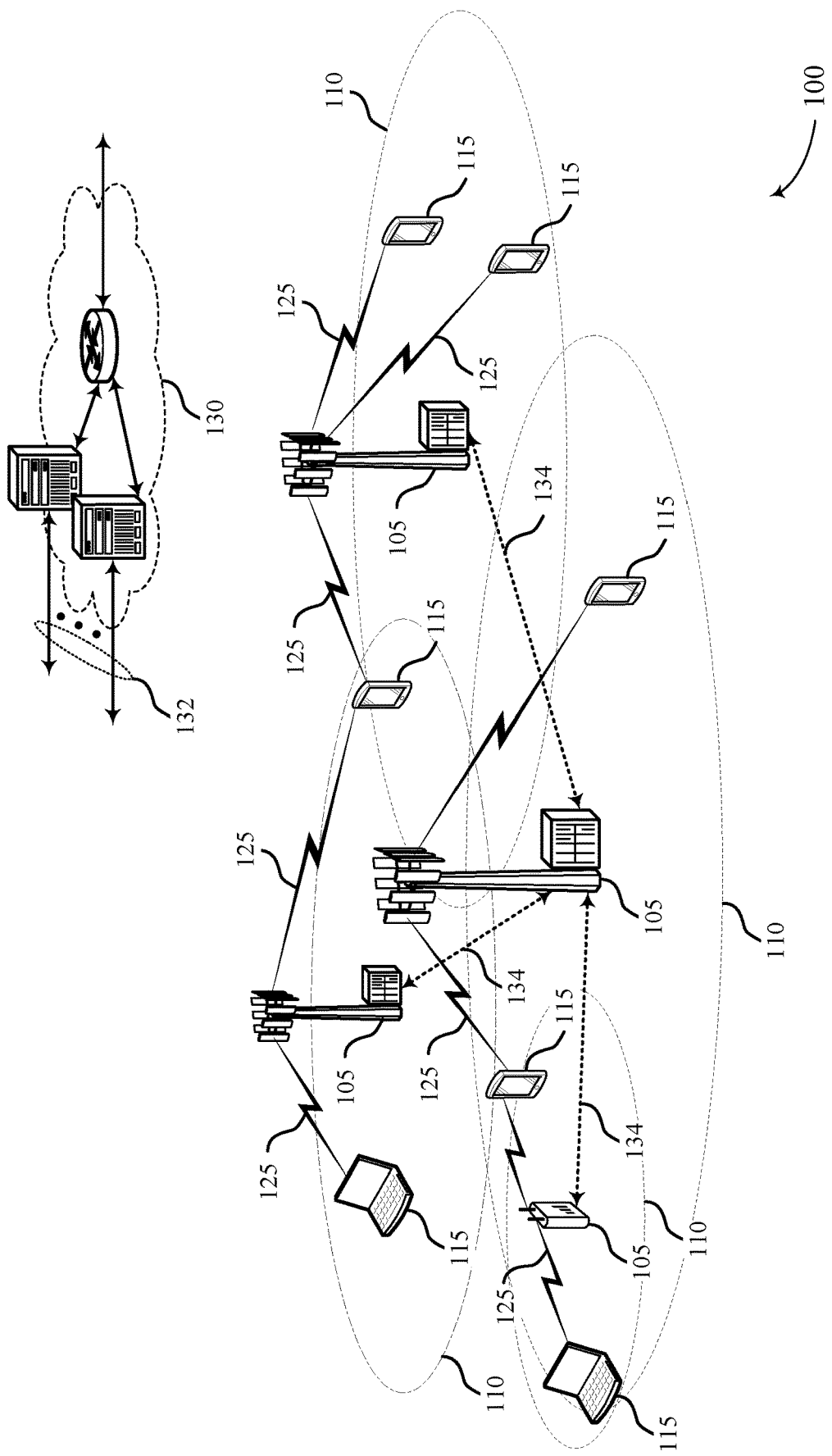
FIG. 1 illustrates an example of a system for wireless communications that supports indication of pause duration for unlicensed band operation in accordance with aspects of the present disclosure.

A wireless communications system may include a number of base stations supporting communication for multiple communication devices, which may be otherwise known as a user equipment (UE). In the wireless communications system, a base station and a UE may operate within an unlicensed frequency spectrum band. In the unlicensed frequency spectrum band, the base station may perform a contention-based scheme, such as listen-before-talk (LBT), on one or more channels to acquire at least one channel for wireless communications in the unlicensed frequency spectrum band. The UE may have a different unlicensed frequency spectrum band operation compared to a licensed frequency spectrum band operation. For example, when operating within an unlicensed frequency spectrum band, communications for the UE may depend on a transmission opportunity. A transmission opportunity may extend for a channel occupancy time, in which the UE may receive downlink communication from the base station or transmit uplink communication to the base station on an acquired channel (e.g., based on the LBT performed by the base station, UE, or a combination thereof).

Within the transmission opportunity, the operating behaviors of the UE may be similar (or the same) to operating behaviors within a licensed frequency spectrum band. For example, the UE may transmit uplink communications (e.g., physical uplink control channel (PUCCH), physical uplink shared channel (PUSCH), references signals) or receive downlink communications (e.g., physical downlink control channel (PDCCH), reference signals) as configured and scheduled. Unlike licensed frequency spectrum band operation, outside the transmission opportunity, the UE may keep monitoring (during initial signal monitoring occasions or channel activity monitoring windows) one or more channels continuously or at least occasionally (e.g., when in sleep mode to save power) to evaluate whether a transmission opportunity is available on at least one channel (e.g., an acquired channel) for wireless communications.

Although the UE's behavior of communicating during transmission opportunities supports reducing or avoiding interference between wireless communications systems sharing a same unlicensed frequency spectrum band (e.g., interference between LTE/NR and Wi-Fi wireless communications systems), the UE's behavior for monitoring for transmission opportunities may result in unnecessary power consumption. That is, a UE may remain in an active mode for extended lengths to monitor for a transmission opportunity, which may prevent the UE from going into a sleep mode. The reason the UE continues to monitor for the transmission opportunity indefinitely is because the transmission opportunity can start at any moment. That is, because the start of a transmission opportunity is opportunistic (contention-based), the UE may be unaware of when the transmission opportunity may start and when the UE may begin uplink transmission or downlink reception. As a result, present UE behavior for monitoring channels to identify transmission opportunities may be (based on UE implementation and) an inefficient use of UE resources (e.g., power consumption).

To improve efficiency of monitoring of a channel (e.g., outside of a channel occupancy time) and decrease use of resources of a UE, it may be beneficial for the UE to monitor the channel (e.g., in unlicensed frequency spectrum band) according to a set of adaptive channel monitoring parameters. For example, the base station may identify or otherwise select a pause duration between successive transmission opportunities. The pause duration generally includes a period of time in which the base station will not transmit on the channel. The pause duration may be a fixed time period (e.g., for fairness in accessing the channel with other devices), a variable time period based on a contention random backoff window, and the like. The base station may transmit or otherwise provide an indication of the pause duration to the UE in signaling carrying a set of channel monitoring parameters. The pause duration may be dynamically configured for the UE, or semi-statically configured for the UE, or a combination thereof. The UE may receive the pause duration and monitor the unlicensed frequency spectrum band accordingly. For example, the UE may enter a sleep mode during the pause duration to conserve power, e.g., may not waste power resources in monitoring the unlicensed frequency spectrum band when there is guaranteed to be no transmissions from the base station.

Particular aspects of the subject matter described herein may be implemented to realize one or more advantages. The described techniques may support improvements in UE operation in the unlicensed frequency spectrum, and may improve efficiency, and mitigate the use of resources of the communication device, among other advantages. As such, supported techniques may include improved network operations and, in some examples, may promote network efficiencies, among other benefits.

Aspects of the disclosure are further illustrated by and described with reference to apparatus diagrams, system diagrams, and flowcharts that relate to indication of pause duration for unlicensed band operation.

FIG. 1 illustrates an example of a wireless communications system 100 that supports indication of pause duration for unlicensed band operation in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission, or reception by the base station 105, or a combination thereof.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related.

The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105, or UEs 115, or a combination thereof that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may receive signaling from a base station that identifies a set of channel monitoring parameters associated with monitoring an unlicensed frequency spectrum band, the channel monitoring parameters including a length of a pause duration between successive transmission opportunities. The UE 115 may identify a termination of a transmission opportunity in the unlicensed frequency spectrum band. The UE 115 may monitor the unlicensed frequency spectrum band following the termination of the transmission opportunity using the set of channel monitoring parameters.

A base station 105 may determine a set of channel monitoring parameters associated with the UE's monitoring of an unlicensed frequency spectrum band, where the channel monitoring parameters may include a length of a pause duration between successive transmission opportunities. The base station 105 may transmit signaling, to a UE 115 in wireless communications with the base station, that identifies the set of channel monitoring parameters associated with monitoring the unlicensed frequency spectrum band.

Figure 2:
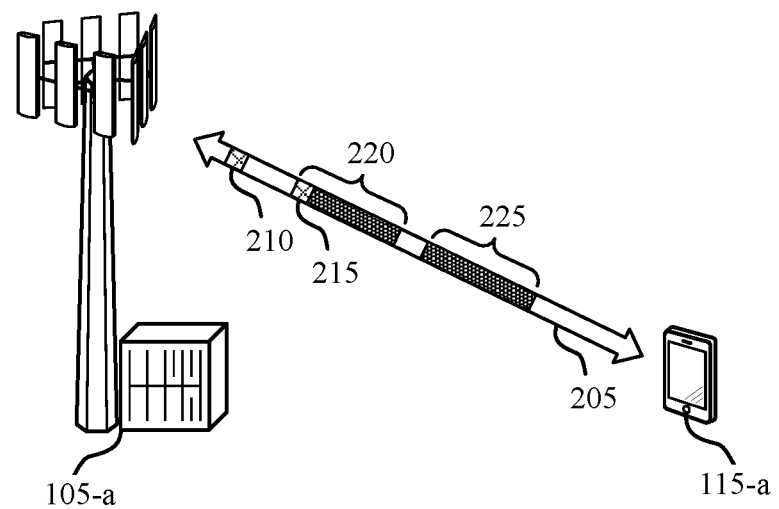
FIG. 2 illustrates an example of a wireless communication system that supports indication of pause duration for unlicensed band operation in accordance with aspects of the present disclosure.

FIG. 2 illustrates an example of a wireless communication system 200 that supports indication of pause duration for unlicensed band operation in accordance with aspects of the present disclosure. The wireless communication system 200 may include a base station 105-a and a UE 115-a, which may be examples of the corresponding devices described herein. In some examples, wireless communication system 200 may implement aspects of wireless communication system 100. For example, the base station 105-a, or the UE 115-a, or a combination thereof may support improvements in channel monitoring for unlicensed frequency spectrum band.

The base station 105-a may perform a connection procedure (e.g., an RRC procedure, such as a cell acquisition procedure, a random access procedure, an RRC connection procedure, an RRC configuration procedure) with the UE 115-a. The base station 105-a and the UE 115-a may be configured with multiple antennas, which may be used for directional or beamformed transmissions. As part of the connection procedure, the base station 105-a and the UE 115-a may establish a communication link 205 for wired or wireless communication. In some aspects, the communication link 205 may be in an unlicensed frequency spectrum band.

The base station 105-a may determine a set of channel monitoring parameters related to the UE's monitoring of an unlicensed frequency spectrum band, e.g., via the communication link 205. The set of channel monitoring parameters may be based on a group UE-common configuration or a UE-specific configuration. In some examples, the channel monitoring parameters may include or otherwise be associated with a pause duration. The base station 105-a may, in some examples, determine the set of channel monitoring parameters (e.g., the pause duration) based on a fairness metric associated with communicating on the unlicensed frequency spectrum band, an LBT procedure performed on the unlicensed frequency spectrum band, a traffic metric associated with the unlicensed frequency spectrum band, or a combination thereof.

In some examples, the base station 105-a may transmit signaling 210 that identifies the set of channel monitoring parameters to the UE 115-a. In some aspects, the signaling 210 may be common signaling (e.g., applicable to any UE associated with base station 105-a), group signaling (e.g., for a particular group of UEs), UE-specific signaling (e.g., specifically for UE 115-a), or a combination thereof. In some examples, the base station 105-a may alternatively, or additionally transmit signaling 215 that identifies the set of channel monitoring parameters to the UE 115-a, during a transmission opportunity 220 (e.g., via dynamic signaling). The base station 105-*a* may include the set of channel monitoring parameters in a control message (e.g., RRC message, downlink control information (DCI), MAC control element (CE)) based on the type of signaling (e.g., dynamic or non-dynamic).

The signaling 210, and 215 may, in some examples, include an index mapping to a lookup entry in a set of lookup entries. The set of lookup entries may include the set of channel monitoring parameters, for example, different pause duration lengths, with their corresponding periodicity of the pause durations, among others. The pause duration may be associated with a set of PDCCH monitoring occasions, a set of initial signal monitoring occasions, a set of reference signal monitoring occasions, a set of beacon signal monitoring occasions, or a set of wakeup signal monitoring occasions, etc. Therefore, the UE 115-*a* may be configured with a lookup table having a set of lookup entries corresponding to pause durations. Generally, each pause duration in the set of lookup entries may correspond to a time period in which base station 105-*a* may not transmit in the unlicensed frequency spectrum band.

The lookup table may, in some examples, be a relational database that may be stored locally at the UE 115-*a*. Upon receiving an index (e.g., the base station 105-*a* may indicate an index in the lookup table via dynamic signaling (e.g., DCI, MAC CE)), the UE 115-*a* may map the index to a lookup entry (e.g., one or more channel monitoring parameter(s)) in a lookup table and configure (or adapt) the monitoring of a channel in an unlicensed frequency spectrum band according to the mapped channel monitoring parameter(s). The UE 115-*a* may, in some examples, autonomously select its own pause duration that is within range or sets provided by the base station 105-*a*.

Following reception or selection of channel monitoring parameters, the UE 115-*a* may monitor a channel in an unlicensed frequency spectrum band using at least one channel monitoring parameter of the received (or mapped) set. In an example where the channel monitoring parameters are provided during a connection procedure (e.g., semi-statically configured), the UE 115-*a* may monitor a channel in an unlicensed frequency spectrum band using at least one channel monitoring parameter of the received set for the transmission opportunity 220. Alternatively, in another example where the channel monitoring parameters are provided during the transmission opportunity 220 via dynamic signaling, the UE 115-*a* may identify a termination of the transmission opportunity 220, and monitor a channel in an unlicensed frequency spectrum band, using at least one channel monitoring parameter of the received set, for a successive transmission opportunity (e.g., during the time between transmission opportunity 220 and transmission opportunity 225). In some examples, the UE 115-*a* may update the channel monitoring parameter for monitoring the channel in the unlicensed frequency spectrum band for the transmission opportunity 225. For example, the UE 115-*a* may receive signaling form a base station identifying new sets (e.g., updated sets) of channel monitoring parameters associated with monitoring a control channel associated with an unlicensed frequency spectrum band during same or different transmission opportunities, and update the channel monitoring parameters to the new (e.g., updated) set of channel monitoring parameters based on the received indication. As such, the UE 115-*a* may change its channel monitoring parameters in and out of transmission opportunities, respectively.

In some aspects, monitoring the channel in the unlicensed frequency spectrum band between successive transmission opportunities may depend on the pause duration indicated in the signaling 210, and 215 provided by base station 105-*a*. In some examples, the indicated (or mapped) pause duration may signal that base station 105-*a* will not transmit at least for a given time period (e.g., the pause duration) between transmission opportunity 220 and transmission opportunity 225. Accordingly, UE 115-*a* may transition to sleep state during the pause duration to conserve power. In another example, UE 115-*a* may tune-away from base station 105-*a* during the pause duration to monitor other frequency spectrum band(s).

In some aspects, set(s) of channel monitoring parameters may be semi-statically configured for UE 115-*a* (e.g., via signaling 210 that lies outside of a transmission opportunity). The semi-statically configured set(s) of channel monitoring parameters may include pause duration(s) that may be considered default pause durations that will be observed by base station 105-*a* between successive transmission opportunities. Accordingly, UE 115-*a* may utilize the set(s) of semi-statically configured channel monitoring parameters (and the corresponding pause durations) to monitor the unlicensed frequency spectrum band.

In some aspects, the set of channel monitoring parameters may be dynamically signaled from base station 105-*a* either during the transmission opportunity (e.g., via signaling 215 during transmission opportunity 220) or before the occurrence of a transmission opportunity (e.g., via signaling 210).

In some aspects, dynamic signaling may be used to override semi-statically configured set(s) of channel monitoring parameters. For example, base station 105-*a* may semi-statically configure set(s) of channel monitoring parameters that UE 115-*a* will default to (e.g., via signaling 210 that occurs prior to transmission opportunity 220). Base station 105-*a* may, subsequently, transmit or otherwise provide an indication of a dynamically configured set of channel monitoring parameters during the transmission opportunity (e.g., via signaling 215 that occurs during transmission opportunity 220). UE 115-*a* may select between the semi-statically configured set(s) of channel monitoring parameters and the dynamically configured set of channel monitoring parameters. In some examples, the UE 115-*a* may automatically select the dynamically configured set of channel monitoring parameters (e.g., the dynamic signaling may override the semi-static signaling). In other examples, UE 115-*a* may autonomously select between the semi-statically configured set(s) of channel monitoring parameters or the dynamically configured set of channel monitoring parameters. For example, UE 115-*a* may weigh additional factors not known by base station 105-*a* when selecting which set of channel monitoring parameters, e.g., based on traffic load, connectivity state, etc.

Thus, aspects of the described techniques may support indication of a pause duration to use for monitoring channel(s) in an unlicensed frequency spectrum band. The described techniques may be based on a gap (e.g., a minimum gap) between the end of one transmission opportunity and the start of the next transmission opportunity, e.g., between successive transmission opportunities. In some aspects, the gap (e.g., the pause duration) may be a fixed gap (e.g., for fairness control to prevent the same base station from grabbing the channel repeatedly for a long duration of time). In some aspects, the gap (e.g., the pause duration) may be based on an LBT, e.g., may defer period and random backoff duration. In some aspects, the gap (or pause duration) may be based on other considerations, e.g., a reserved duration for other purposes, such as emergency traffic, or other reserved services.

Within a channel occupancy time of a transmission opportunity, base station 105-a may indicate the expected or minimum pause duration to the base stations 105-a serving UEs 115. The indication may be provided through PDCCH, MAC CE, RRC signaling, among others. The indication may be common for all (or a group of) UEs, or specific to each UE. The indication may be semi-static, dynamic, or a combination thereof. A semi-static indication may be used to configure a default pause duration, whereas a dynamic indication per transmission opportunity may (or may not) overwrite the semi-static value and be effective for a duration (e.g., before the next transmission opportunity). If the pause duration contains a random backoff duration for the next LBT, base station 105-a may draw a random number to determine the backoff duration prior to the actual start of the LBT procedure to select the appropriate pause duration. The indicated pause duration may be a value (e.g., a minimum value) that base station 105-a guarantees no signal over the unlicensed frequency spectrum band, whereas the actual gap between two transmission opportunities may depend on channel condition, the number of contending nodes, and the like.

When a channel occupancy time ends, UE 115-a may not start monitoring the channel (e.g., for detecting initial signal or activity indication signal from base station 105-a) immediately, but, instead, may wait for the indicated pause duration before starting channel monitoring. The end of the channel occupancy time may be indicated by base station 105-a, or detected by UE 115-a, or a combination thereof. During the pause duration, UE 115-a may be in a sleep mode for power saving.

Adapting channel monitoring for unlicensed frequency spectrum band may provide benefits and enhancements to the operation of the UE 115-a. For example, by providing a set of channel monitoring parameters, the operational characteristics, such as power consumption, processor utilization, and memory usage related to channel monitoring for unlicensed frequency spectrum band operation may be reduced. Adapting channel monitoring for unlicensed frequency spectrum band may also provide efficiency to the UE 115-a by reducing the latency associated with processes related to wireless communications, and more specifically to channel monitoring for unlicensed frequency spectrum band operation.

Figure 3:
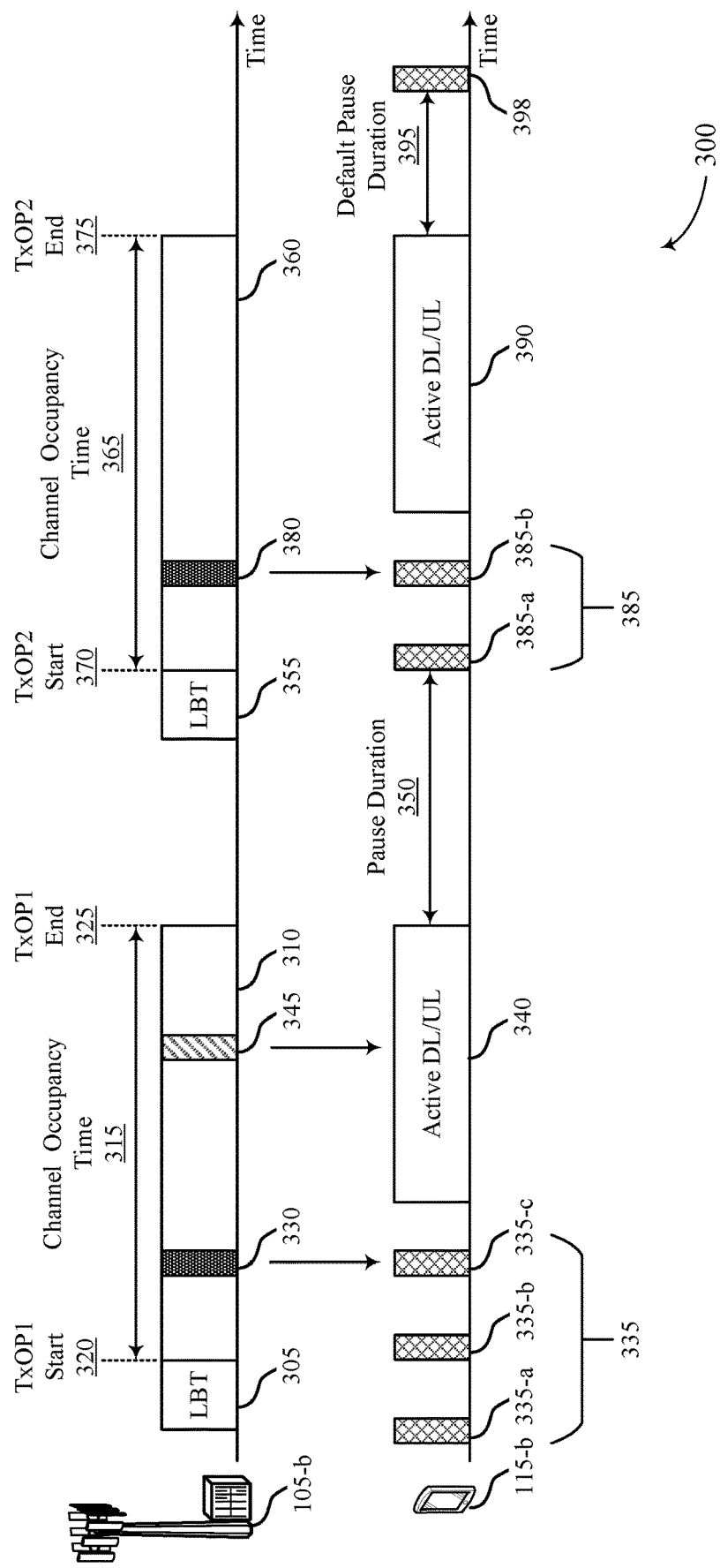
FIG. 3 illustrates an example of a timeline that supports indication of pause duration for unlicensed band operation in accordance with aspects of the present disclosure.

FIG. 3 illustrates an example of a timeline 300 that supports indication of pause duration for unlicensed band operation in accordance with aspects of the present disclosure. The timeline 300 may include a base station 105-b and a UE 115-b, which may be examples of the corresponding devices described herein. In some examples, timeline 300 may implement aspects of wireless communication systems 100 or 200. For example, the base station 105-b and the UE 115-b may operate within an unlicensed frequency spectrum band and support improvements in channel monitoring for the unlicensed frequency spectrum band operation.

When operating in an unlicensed frequency spectrum band, the base station 105-b (or the UE 115-b) may support a contention-based channel access scheme to acquire a communication channel in the unlicensed frequency spectrum band. For example, the base station 105-b may perform an LBT 305 on one or more channels to acquire at least one channel in an unlicensed frequency spectrum band for wireless communications with the UE 115-b. In some examples, acquiring at least one channel in an unlicensed frequency spectrum band according to the LBT 305 may result in a transmission opportunity 310 for the base station 105-b and the UE 115-b. The transmission opportunity 310 may extend for a channel occupancy time 315, in which the UE 115-b may have either or both active downlink and uplink communications 340. For example, the UE 115-b may receive downlink communication from the base station 105-b or transmit uplink communication to the base station 105-b on the acquired channel (e.g., based on the LBT 305). Therefore, when operating in an unlicensed frequency spectrum band, communication for the UE 115-b may be subject to the transmission opportunity 310, and more specifically to the channel occupancy time 315.

Conventionally, UE 115-b may monitor one or more channels in the unlicensed frequency spectrum band to identify (detect) the transmission opportunity 310. For example, the UE 115-b may monitor one or more channels in the unlicensed frequency spectrum band based on a length of a channel monitoring window 335 or a periodicity (interval or period) of channel monitoring windows 335 (e.g., channel monitoring windows 335-a through 335-c). In some examples, the UE 115-b may monitor one or more channels in the unlicensed frequency spectrum band continuously or at least occasionally according to the channel monitoring window(s) 335, to identify a transmission opportunity (e.g., transmission opportunity 310), which may be an inefficient use of resources for the UE 115-b. For example, the UE 115-b may remain in an active mode for extended lengths to monitor one or more channels, which may prevent the UE 115-b from switching into a sleep mode. The reason the UE 115-b continues to monitor the one or more channels indefinitely is because the transmission opportunity 310 can start at any moment. That is, because a start 320 of the transmission opportunity 310 is opportunistic (based on the LBT 305), the UE 115-b may be unaware of the start 320 or end 325 of the transmission opportunity 310. Additionally, the UE 115-b may be unaware of when the UE 115-b may begin the active downlink and uplink communications 340.

To resolve these challenges, improve efficiency of the monitoring of a channel in an unlicensed frequency spectrum band (e.g., and outside of the channel occupancy time 315), and minimize use of resources of the UE 115-b, it may be beneficial for the UE 115-b to monitor a channel (e.g., in unlicensed frequency spectrum band) according to a set of channel monitoring parameters (e.g., a pause duration between successive transmission opportunities). In some examples, when the transmission opportunity 310 is initiated by the base station 105-b, the base station 105-b may transmit signaling 330 (e.g., an initial signal, or an activity indication) to indicate the start 320 of the transmission opportunity 310 to its serving UEs (e.g., UE 115-b). The UE 115-b may receive the signaling 330 based on the channel monitoring window(s) 335. For example, the UE 115-b may receive the signaling 330 during channel monitoring window 335-c. The channel monitoring window(s) 335 may include at least one of a set of PDCCH monitoring occasions, a set of initial signal monitoring occasions, a set of reference signal monitoring occasions, a set of beacon signal monitoring occasions, or a set of wakeup signal monitoring occasions, among others. In some examples, the signaling 330 may include a set of channel monitoring parameters associated with monitoring a channel in an unlicensed frequency spectrum band.

Conventionally, upon termination of the transmission opportunity 310, the UE 115-b may monitor the channel in the unlicensed frequency spectrum band according to the set of channel monitoring parameters. This may result in inefficient use of resources of the UE 115-*b*. For example, a subsequent transmission opportunity may be available sooner or later, and the present set of channel monitoring parameters may not account for this change. However, the base station 105-*b* may be aware of these changes to the channel, and indicate the change based on an updated set of channel monitoring parameters to the UE 115-*b*. As a result, the UE 115-*b* may adapt its channel monitoring for unlicensed frequency spectrum band between successive transmission opportunities according to the updated set of channel monitoring parameters. That is, at the start 320 of the transmission opportunity 310, the UE 115-*b* may detect channel activity (e.g., or via signaling 330) and change its behavior (e.g., switch into active mode) according to a set of channel monitoring parameters included in the signaling 330. During transmission opportunity 310, base station 105-*b* may transmit signaling 345 to UE 115-*b* that carries or otherwise conveys an indication of an updated set of channel monitoring parameters. The signaling 345 (or the signaling 330, or a combination thereof) may identify a pause duration 350. Generally, the pause duration 350 is a length of time between successive transmission opportunities that base station 105-*b* will not transmit on the unlicensed frequency spectrum band. For example, base station 105-*b* may consider channel-use fairness, LBT backoff windows, and the like, when selecting a pause duration 350.

The UE 115-*b* may determine the end 325 of the transmission opportunity 310 based on an indication (e.g., signaling including an updated set of channel monitoring parameters) from the base station 105-*b* or by detecting the channel inactivity, and change the behavior (e.g., switch into sleep mode) of the UE 115-*b* according to the updated set of channel monitoring parameters indicating the length of pause duration 350.

Upon termination of the sleep mode (e.g., after pause duration 350), UE 115-*b* may monitor one or more channels in the unlicensed frequency spectrum band to identify (detect) the transmission opportunity 360. For example, the UE 115-*b* may monitor one or more channels in the unlicensed frequency spectrum band based on a length of channel monitoring window 385 or a periodicity (interval or period) of channel monitoring windows 385 (e.g., channel monitoring windows 385-*a* and 385-*b*). In some examples, the UE 115-*b* may monitor one or more channels in the unlicensed frequency spectrum band according to the channel monitoring window(s) 385, to identify a transmission opportunity (e.g., transmission opportunity 360), which may be an inefficient use of resources for the UE 115-*b* using conventional techniques. However, UE 115-*b* may conserve power by entering the sleep mode (or tuning away to attend to communications on other frequency spectrum bands) during the pause duration 350. UE 115-*b* may remain in an active mode to monitor one or more channels until UE 115-*b* detects signaling 380 from base station 115-*b*. A start 370 of the transmission opportunity 360 is opportunistic (based on the LBT 355), UE 115-*b* may be unaware of the start 370 or end 375 of the transmission opportunity 360 until UE 115-*b* detects signaling 380. The UE 115-*b* may receive the signaling 380 based on the channel monitoring window(s) 385. For example, the UE 115-*b* may receive the signaling 380 during channel monitoring window 385-*b*. In some examples, the signaling 380 may include a set of channel monitoring parameters associated with monitoring a channel in an unlicensed frequency spectrum band. Accordingly, UE 115-*b* may participate in the transmission opportunity 360 during the corresponding channel occupancy time 365 be performing active uplink, or downlink, communications 390, or a combination thereof with base station 105-*b*.

However, during transmission opportunity 360, base station 105-*b* may not transmit or otherwise provide signaling corresponding to signaling 345 of transmission opportunity 310. In this instance, UE 115-*b* may rely on semi-statically configured set(s) of channel monitoring parameters (e.g., previously provide from base station 105-*b*) and utilize default pause duration 395 upon end 375 of transmission opportunity 360. At the end of pause duration 395, UE 115-*b* may again monitor the channel(s) of the unlicensed frequency spectrum band according to channel monitoring window 398.

Adapting channel monitoring for unlicensed frequency spectrum band may provide benefits and enhancements to the operation of the UE 115-*b*. For example, by providing a set of channel monitoring parameters, the operational characteristics, such as power consumption, processor utilization, and memory usage related to channel monitoring for unlicensed frequency spectrum band operation may be reduced. Adapting channel monitoring for unlicensed frequency spectrum band may also provide efficiency to the UE 115-*b* by reducing latency associated with processes related to wireless communications, and more specifically to channel monitoring for unlicensed frequency spectrum band operation.

Figure 4:
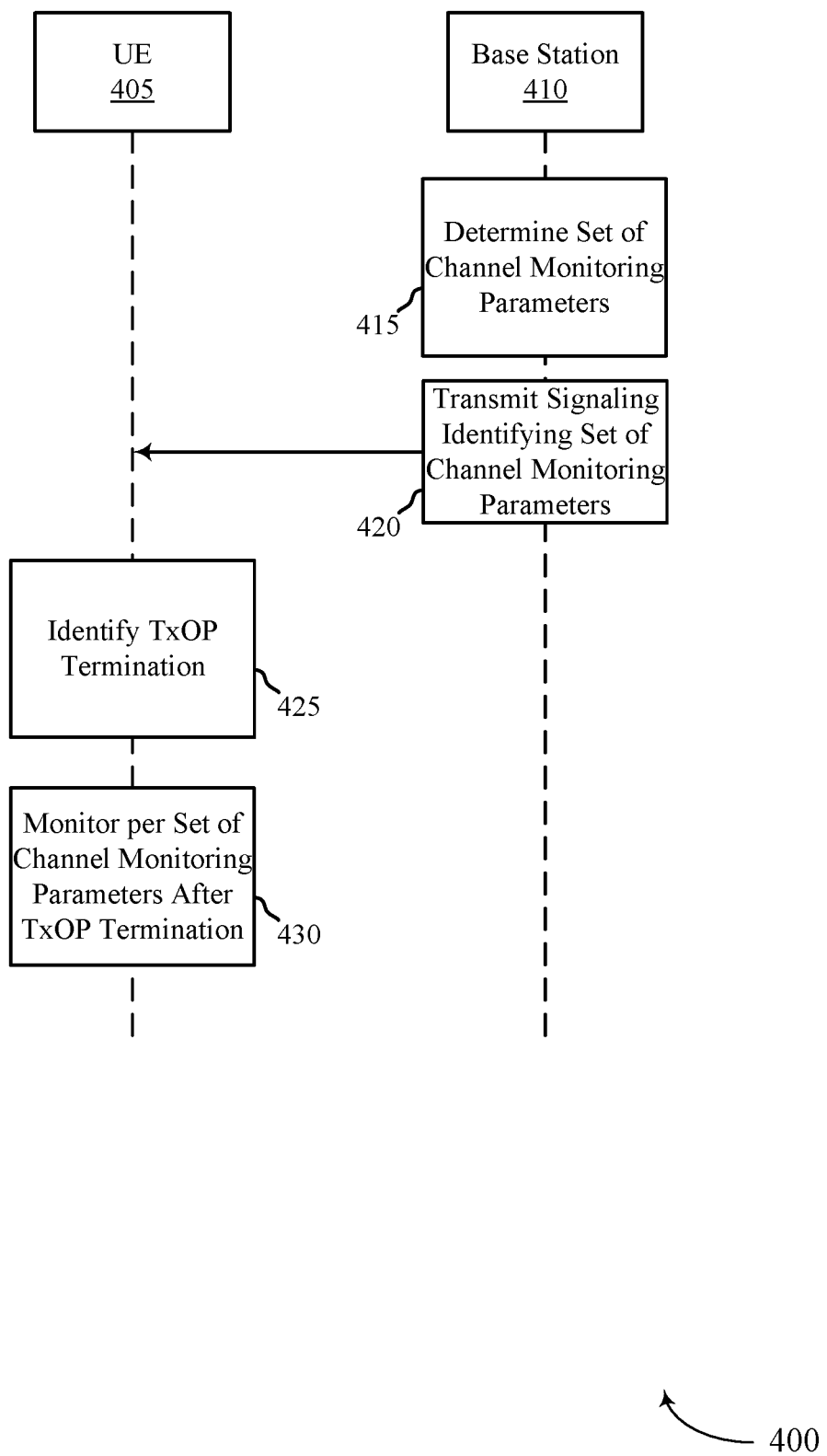
FIG. 4 illustrates an example of a process that supports indication of pause duration for unlicensed band operation in accordance with aspects of the present disclosure.

FIG. 4 illustrates an example of a process 400 that supports indication of pause duration for unlicensed band operation in accordance with aspects of the present disclosure. In some examples, process 400 may implement aspects of wireless communication systems 100 or 200, or timeline 300, or a combination thereof. Aspects of process 400 may be implemented by UE 405, base station 410, or a combination thereof, which may be examples of corresponding devices described herein.

At 415, base station 410 may identify or otherwise determine a set of channel monitoring parameters associated with monitoring an unlicensed frequency spectrum band. The set of channel monitoring parameters may include a length of a pause duration between successive transmission opportunities. In some aspects, base station 410 may identify or otherwise select the pause duration based on a fairness metric associated with communicating on the unlicensed frequency spectrum band, an LBT procedure performed on the unlicensed frequency spectrum band, a traffic metric associated with the unlicensed frequency spectrum band, and the like.

At 420, base station 410 may transmit (and UE 405 may receive) signaling that identifies a set of channel monitoring parameters associated with monitoring the unlicensed frequency spectrum band. UE 405 may, based on the signaling, identify or otherwise determine from the set of channel monitoring parameters the length of the pause duration between successive transmission opportunities.

In some aspects, the configuration signaling may be semi-static signaling, dynamic signaling, or a combination thereof. For example, base station 410 may transmit (and UE 405 may receive) semi-static configuration signaling prior to the transmission opportunity that configures one or more sets of channel monitoring parameters, with each channel monitoring parameter set including a corresponding pause duration. UE 405 may utilize a pause duration configured in the one or more sets of channel monitoring parameters to monitor the unlicensed frequency spectrum band between successive transmission opportunities, e.g., may determine when to sleep and when to monitor the unlicensed frequency spectrum band for the next transmission opportunity. In some aspects, the semi-static configuration signaling may be valid indefinitely or for a set number of channel monitoring windows.

In some aspects, dynamic signaling may be used to configure or otherwise identify the set of channel monitoring parameters (with the associated pause duration) during some or all of the transmission opportunities. For example, base station 410 may transmit (and UE 405 may receive) signaling that configures or otherwise identifies a set of channel monitoring parameters, with a corresponding pause duration, during some or all of the transmission opportunities. UE 405 may use that pause duration when monitoring the unlicensed frequency spectrum band after the current transmission opportunity ends and before the next transmission opportunity begins. The dynamic signaling may be used to configure the set of channel monitoring parameters for one channel monitoring window or for a defined number of channel monitoring windows.

In some aspects, dynamic signaling may be used in conjunction with semi-static configuration signaling. For example, the semi-static configuration signaling may be provided prior to the transmission opportunity that configures the one or more sets of channel monitoring parameters (each set with a corresponding pause duration). However, base station 410 may transmit (and UE 405 may receive) dynamic signaling during a transmission opportunity that identifies or otherwise indicates a second set of channel monitoring parameters that include a dynamically indicated pause duration. UE 405 may select between the corresponding pause duration from the set of channel monitoring parameters of the one or more sets of channel monitoring parameters (e.g., the semi-statically configured pause duration) or the dynamically indicated pause duration. UE 405 may monitor the unlicensed frequency spectrum band according to the selected pause duration. In some aspects, UE 405 may utilize the selected pause duration to monitor the unlicensed frequency spectrum band for one, or for a certain number of successive transmission opportunities.

At 425, UE 410 may determine or otherwise identify a termination of the transmission opportunity in the unlicensed frequency spectrum band. In some aspects, this may be based on signaling received from base station 410 (e.g., an indication of an end time associated with the transmission opportunity), or may be detected by UE 405 (e.g., by detecting inactivity over the channel), or a combination thereof.

At 430, UE 405 may monitor the unlicensed frequency spectrum band following the termination of the transmission opportunity and using the set of channel monitoring parameters. For example, UE 405 may transition to a sleep mode for some or all of the pause duration indicated in the set of channel monitoring parameters, and then transition to an active mode to monitor the unlicensed frequency spectrum band to detect the next transmission opportunity. In some aspects, this may include UE 405 transition to a sleep mode for a time period based on the pause duration (e.g., for some or all of the length of the pause duration).

Figure 5:
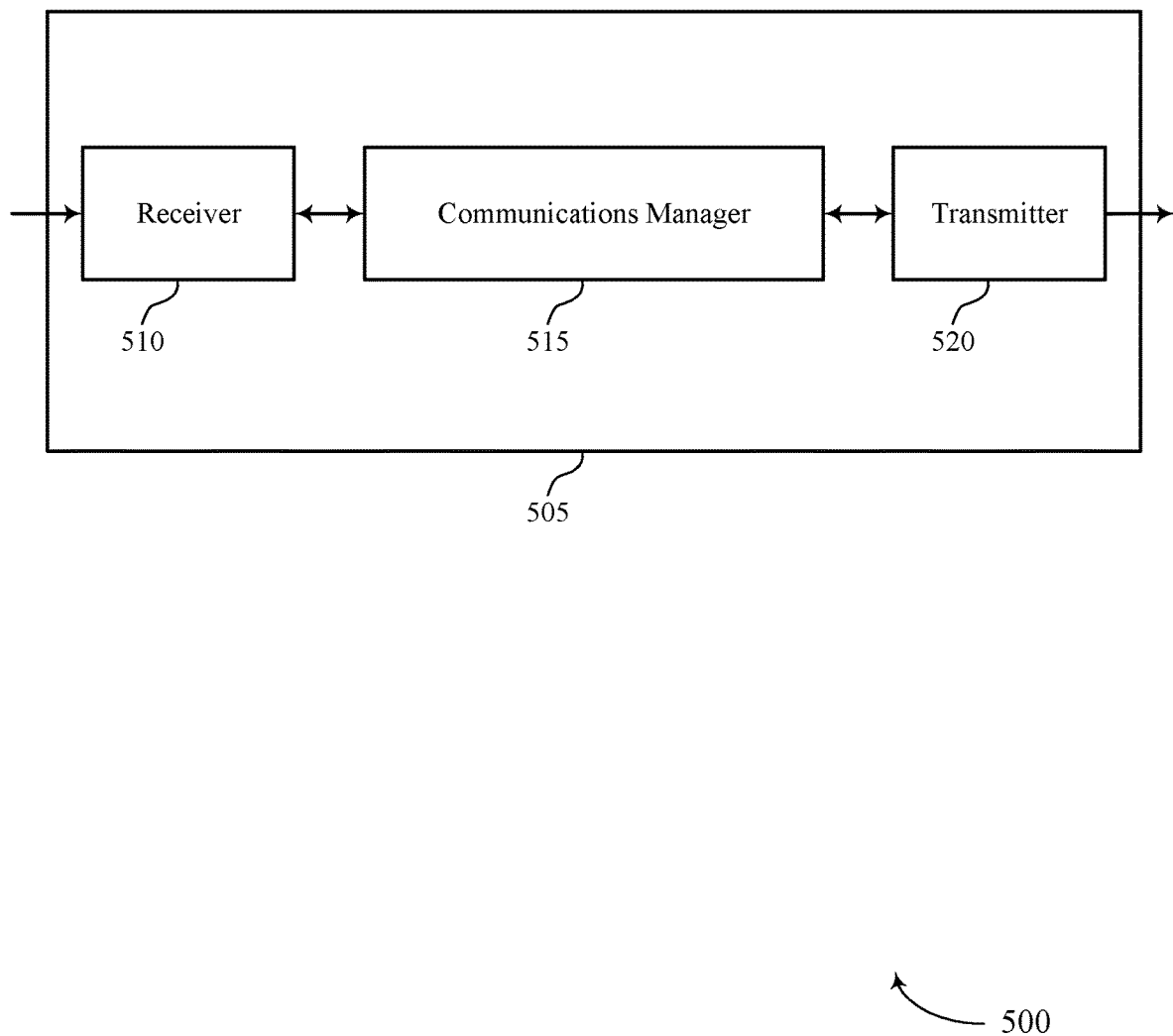
FIGS. 5 and 6 show block diagrams of devices that support indication of pause duration for unlicensed band operation in accordance with aspects of the present disclosure.

FIG. 5 shows a block diagram 500 of a device 505 that supports indication of pause duration for unlicensed band operation in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to indication of pause duration for unlicensed band operation). Information may be passed on to other components of the device 505. The receiver 510 may be an example of aspects of the transceiver 820 described with reference to FIG. 8. The receiver 510 may utilize a single antenna or a set of antennas.

The communications manager 515 may receive signaling from a base station that identifies a set of channel monitoring parameters associated with monitoring an unlicensed frequency spectrum band, the channel monitoring parameters including a length of a pause duration between successive transmission opportunities, identify a termination of a transmission opportunity in the unlicensed frequency spectrum band, and monitor the unlicensed frequency spectrum band following the termination of the transmission opportunity using the set of channel monitoring parameters. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The communications manager 515 as described herein may be implemented to realize one or more potential advantages. One implementation may allow the device 505 to more efficiently monitor a communication channel while operating within an unlicensed frequency spectrum, and more specifically to coordinate channel monitoring parameters between the device 505 to one or more base stations. For example, the device 505 may receive a set of channel monitoring parameters and may monitor a communication channel according to the set of parameters.

Based on implementing the monitoring techniques as described herein, a processor of a UE 115 (e.g., controlling the receiver 510, the transmitter 520, or the transceiver 820 as described with reference to FIG. 8) may increase efficiency and decrease the resources used in the monitoring of communication channels in an unlicensed frequency spectrum as the UE may monitor according to a set of received monitoring parameters.

Figure 6:
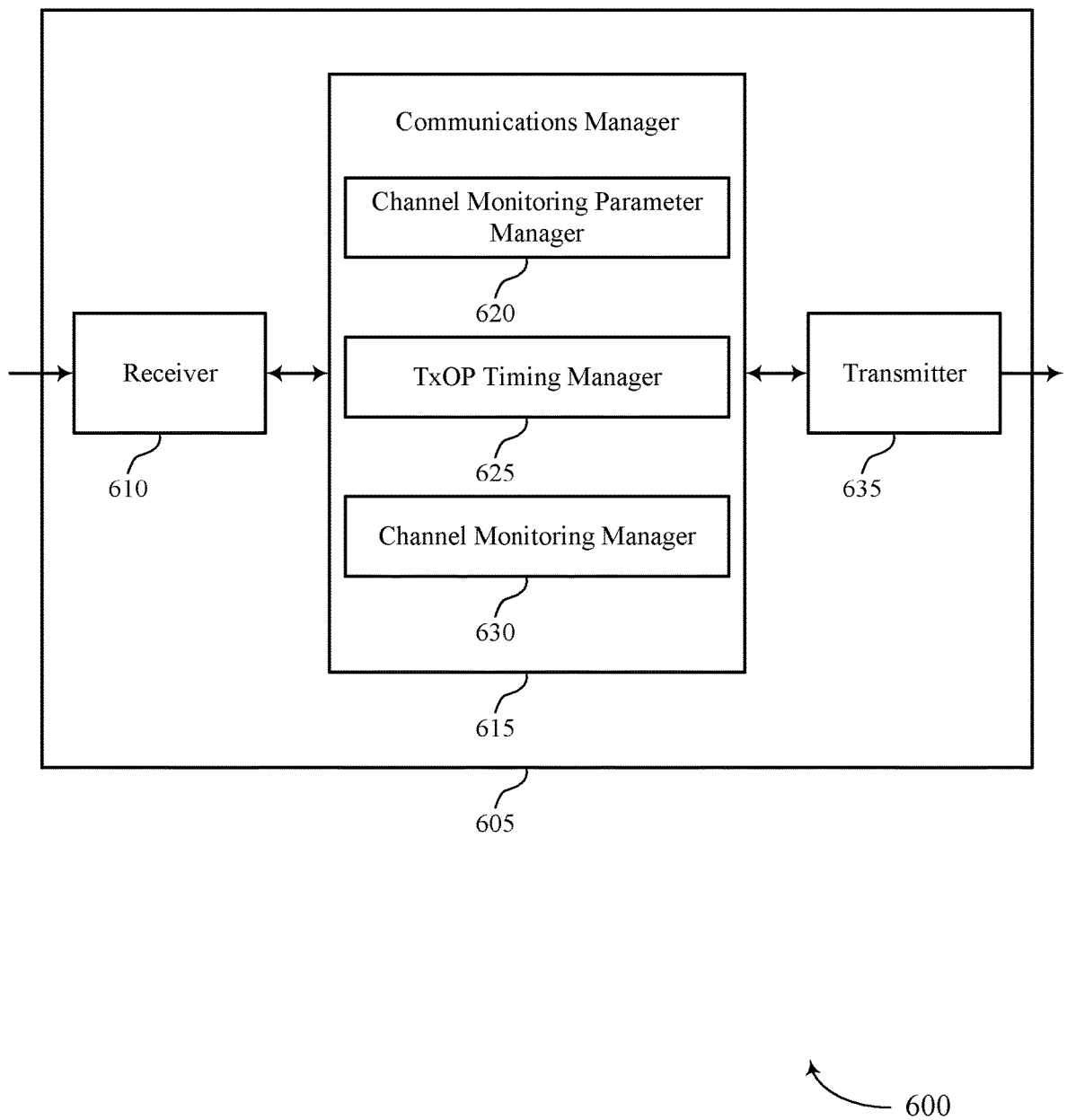

FIG. 6 shows a block diagram 600 of a device 605 that supports indication of pause duration for unlicensed band operation in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to indication of pause duration for unlicensed band operation). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a channel monitoring parameter manager 620, a transmission opportunity (txOP) timing manager 625, and a channel monitoring manager 630. The communications manager 615 may be an example of aspects of the communications manager 810 described herein.

The channel monitoring parameter manager 620 may receive signaling from a base station that identifies a set of channel monitoring parameters associated with monitoring an unlicensed frequency spectrum band, the channel monitoring parameters including a length of a pause duration between successive transmission opportunities.

The TxOP timing manager 625 may identify a termination of a transmission opportunity in the unlicensed frequency spectrum band.

The channel monitoring manager 630 may monitor the unlicensed frequency spectrum band following the termination of the transmission opportunity using the set of channel monitoring parameters.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
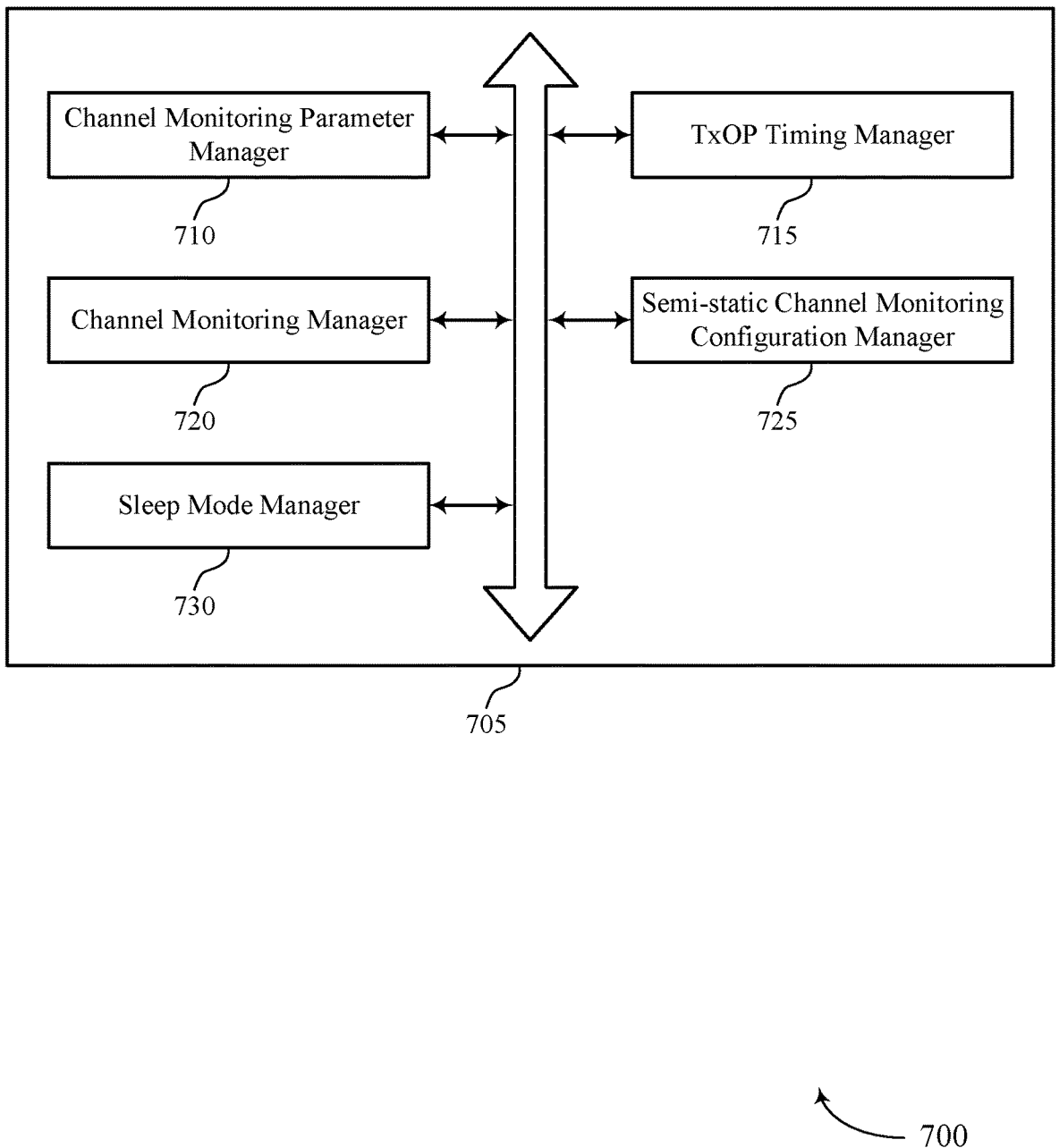
FIG. 7 shows a block diagram of a communications manager that supports indication of pause duration for unlicensed band operation in accordance with aspects of the present disclosure.

FIG. 7 shows a block diagram 700 of a communications manager 705 that supports indication of pause duration for unlicensed band operation in accordance with aspects of the present disclosure. The communications manager 705 may be an example of aspects of a communications manager 515, a communications manager 615, or a communications manager 810 described herein. The communications manager 705 may include a channel monitoring parameter manager 710, a TxOP timing manager 715, a channel monitoring manager 720, a semi-static channel monitoring configuration manager 725, and a sleep mode manager 730. Each of these modules may communicate, directly or indirectly, with one another (e.g., via one or more buses).

The channel monitoring parameter manager 710 may receive signaling from a base station that identifies a set of channel monitoring parameters associated with monitoring an unlicensed frequency spectrum band, the channel monitoring parameters including a length of a pause duration between successive transmission opportunities. In some cases, the signaling is received from the base station during the transmission opportunity. In some cases, a DCI signaling, a MAC CE, or an RRC signaling. In some cases, a common signaling, a group signaling, or a UE-specific signaling.

The TxOP timing manager 715 may identify a termination of a transmission opportunity in the unlicensed frequency spectrum band.

The channel monitoring manager 720 may monitor the unlicensed frequency spectrum band following the termination of the transmission opportunity using the set of channel monitoring parameters.

The semi-static channel monitoring configuration manager 725 may receive semi-static configuration signaling from the base station prior to the transmission opportunity, the semi-static configuration signaling configuring one or more sets of channel monitoring parameters, each channel monitoring set including a corresponding pause duration. In some examples, receiving dynamic signaling during the transmission opportunity that includes a second set of channel monitoring parameters, the second set of channel monitoring parameters including a dynamically indicated pause duration between the transmission opportunity and a next transmission opportunity.

In some examples, the semi-static channel monitoring configuration manager 725 may select either the corresponding pause duration from a set of channel monitoring parameters of the one or more sets of channel monitoring parameters or the dynamically indicated pause duration. In some examples, the semi-static channel monitoring configuration manager 725 may monitor the unlicensed frequency spectrum band based on the selected pause duration between the transmission opportunity and the next transmission opportunity.

In some examples, the semi-static channel monitoring configuration manager 725 may monitor, based on the selected pause duration, the unlicensed frequency spectrum band for a number of successive transmission opportunities.

The sleep mode manager 730 may transition to a sleep mode for a time period based on the pause duration.

Figure 8:
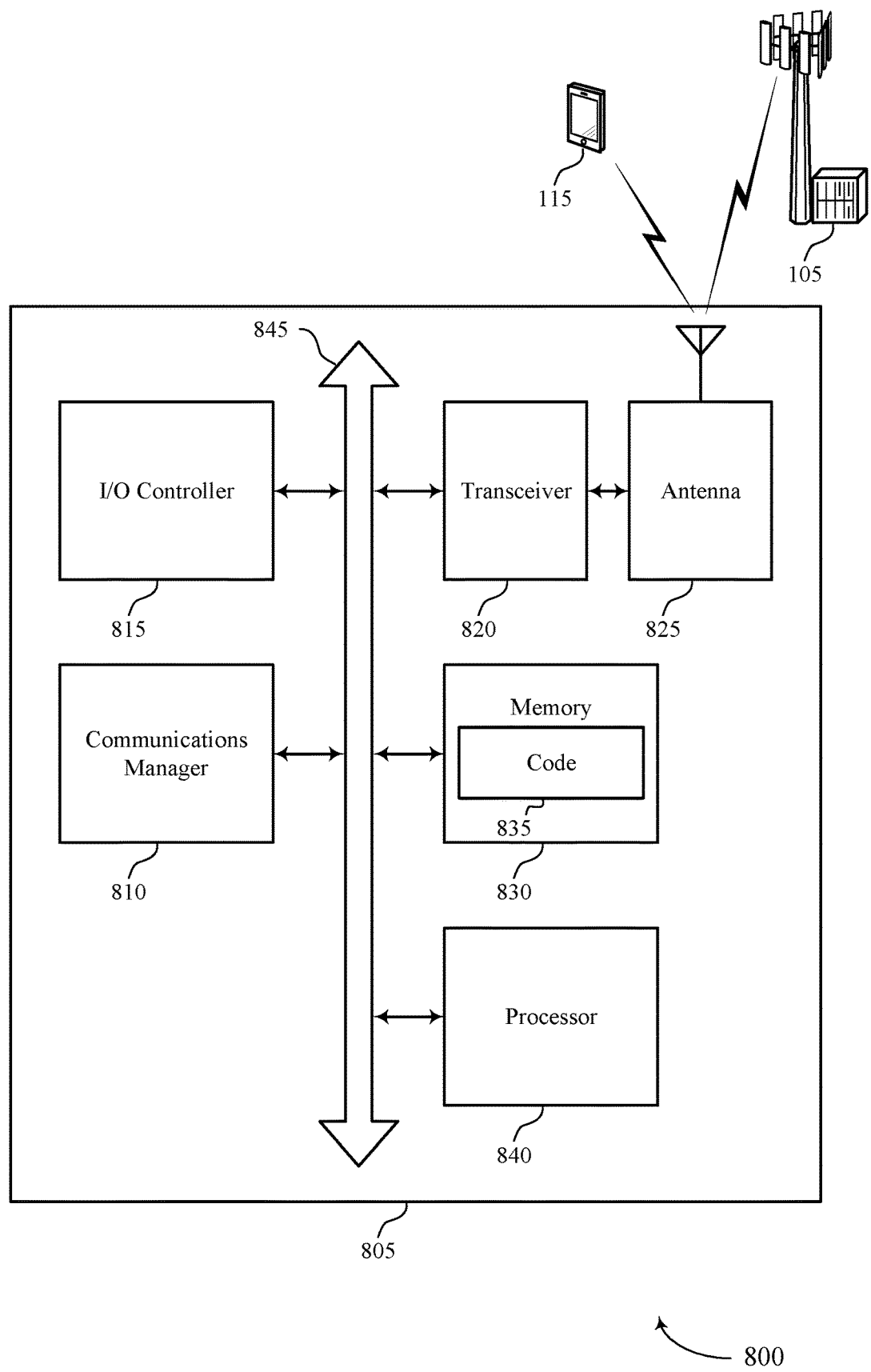
FIG. 8 shows a diagram of a system including a device that supports indication of pause duration for unlicensed band operation in accordance with aspects of the present disclosure.

FIG. 8 shows a diagram of a system 800 including a device 805 that supports indication of pause duration for unlicensed band operation in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive signaling from a base station that identifies a set of channel monitoring parameters associated with monitoring an unlicensed frequency spectrum band, the channel monitoring parameters including a length of a pause duration between successive transmission opportunities, identify a termination of a transmission opportunity in the unlicensed frequency spectrum band, and monitor the unlicensed frequency spectrum band following the termination of the transmission opportunity using the set of channel monitoring parameters.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touch-screen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting indication of pause duration for unlicensed band operation).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
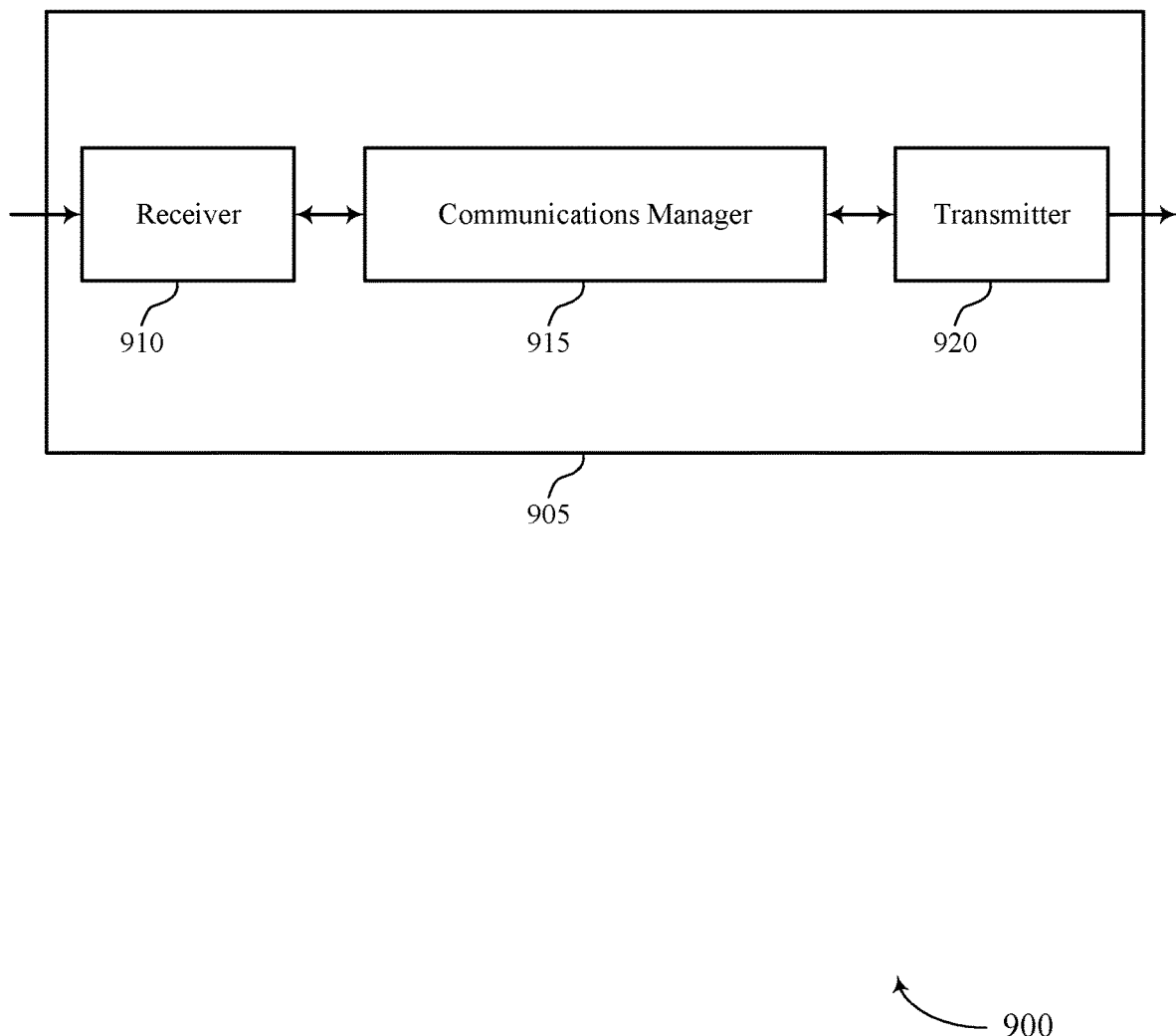
FIGS. 9 and 10 show block diagrams of devices that support indication of pause duration for unlicensed band operation in accordance with aspects of the present disclosure.

FIG. 9 shows a block diagram 900 of a device 905 that supports indication of pause duration for unlicensed band operation in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to indication of pause duration for unlicensed band operation). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine a set of channel monitoring parameters associated with monitoring an unlicensed frequency spectrum band, the channel monitoring parameters including a length of a pause duration between successive transmission opportunities and transmit signaling, to a UE in wireless communications with the base station, that identifies the set of channel monitoring parameters associated with monitoring the unlicensed frequency spectrum band. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
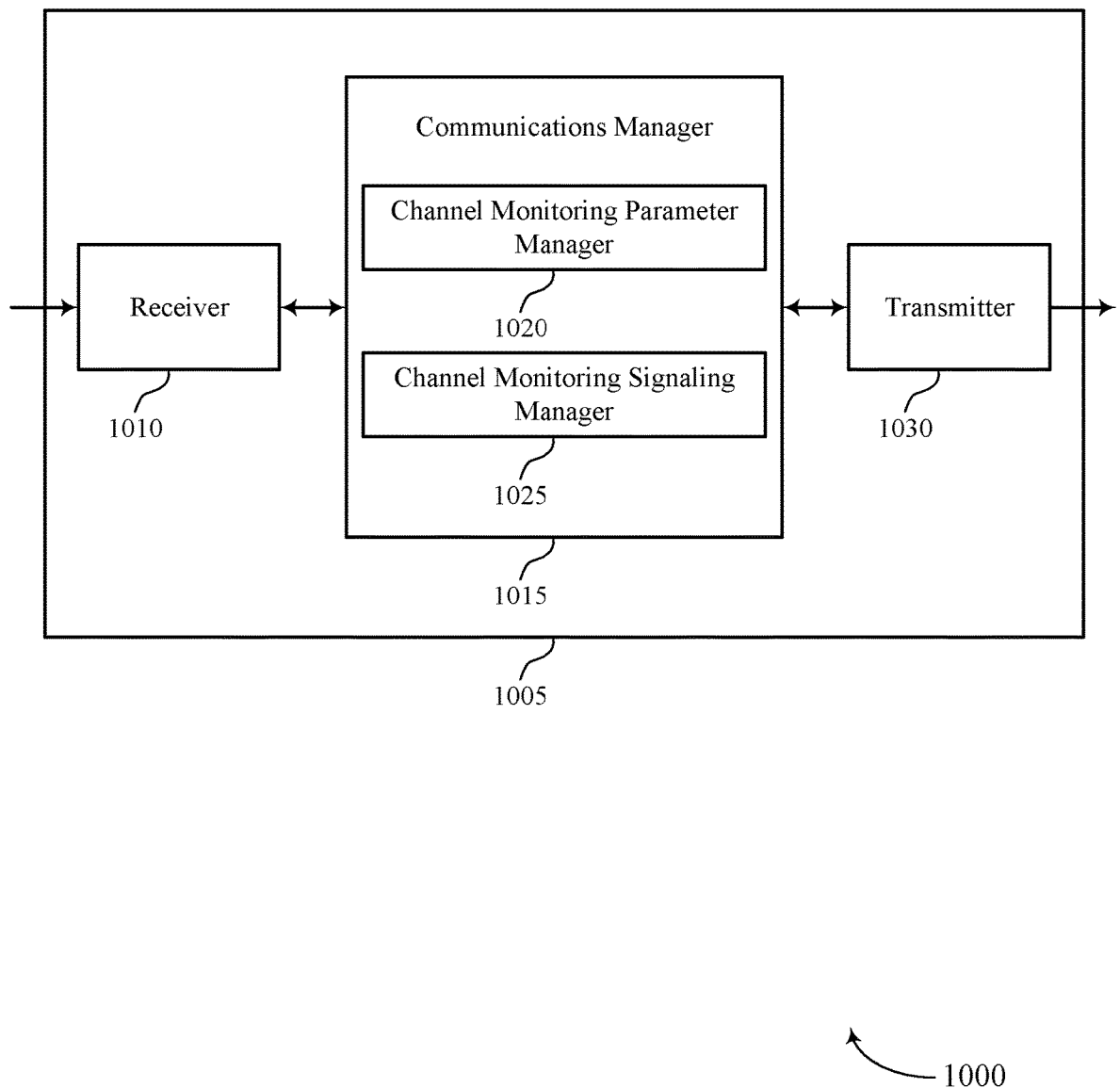

FIG. 10 shows a block diagram 1000 of a device 1005 that supports indication of pause duration for unlicensed band operation in accordance with aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to indication of pause duration for unlicensed band operation). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a channel monitoring parameter manager 1020 and a channel monitoring signaling manager 1025. The communications manager 1015 may be an example of aspects of the communications manager 1210 described herein.

The channel monitoring parameter manager 1020 may determine a set of channel monitoring parameters associated with monitoring an unlicensed frequency spectrum band, the channel monitoring parameters including a length of a pause duration between successive transmission opportunities.

The channel monitoring signaling manager 1025 may transmit signaling, to a UE in wireless communications with the base station, that identifies the set of channel monitoring parameters associated with monitoring the unlicensed frequency spectrum band.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
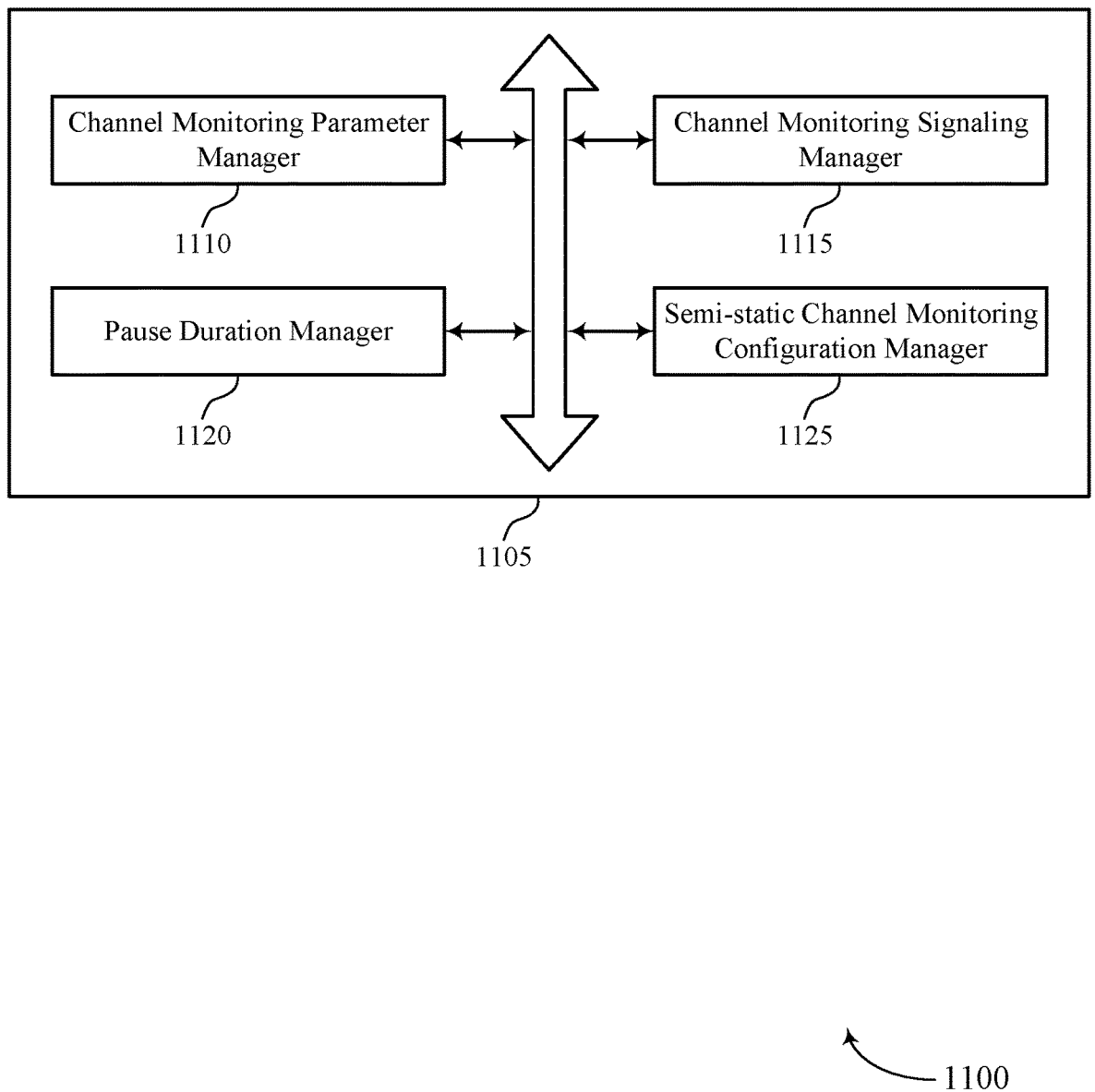
FIG. 11 shows a block diagram of a communications manager that supports indication of pause duration for unlicensed band operation in accordance with aspects of the present disclosure.

FIG. 11 shows a block diagram 1100 of a communications manager 1105 that supports indication of pause duration for unlicensed band operation in accordance with aspects of the present disclosure. The communications manager 1105 may be an example of aspects of a communications manager 915, a communications manager 1015, or a communications manager 1210 described herein. The communications manager 1105 may include a channel monitoring parameter manager 1110, a channel monitoring signaling manager 1115, a pause duration manager 1120, and a semi-static channel monitoring configuration manager 1125. Each of these modules may communicate, directly or indirectly, with one another (e.g., via one or more buses).

The channel monitoring parameter manager 1110 may determine a set of channel monitoring parameters associated with monitoring an unlicensed frequency spectrum band, the channel monitoring parameters including a length of a pause duration between successive transmission opportunities.

The channel monitoring signaling manager 1115 may transmit signaling, to a UE in wireless communications with the base station, that identifies the set of channel monitoring parameters associated with monitoring the unlicensed frequency spectrum band. In some cases, the signaling is transmitted to the UE during the transmission opportunity. In some cases, a DCI signaling, a MAC CE, or an RRC signaling. In some cases, a common signaling, a group signaling, or a UE-specific signaling.

The pause duration manager 1120 may identify the pause duration based on one or more of a fairness metric associated with communicating on the unlicensed frequency spectrum band, an LBT procedure performed on the unlicensed frequency spectrum band, a traffic metric associated with the unlicensed frequency spectrum band, or a combination thereof.

The semi-static channel monitoring configuration manager 1125 may transmit semi-static configuration signaling to the UE prior to a transmission opportunity, the semi-static configuration signaling including configuring one or more sets of channel monitoring parameters, each channel monitoring set including a corresponding pause duration. In some examples, transmitting dynamic signaling during the transmission opportunity that includes a second set of channel monitoring parameters, the second set of channel monitoring parameters including a dynamically indicated pause duration between the transmission opportunity and a next transmission opportunity. In some cases, the dynamically indicated pause duration is for a number of successive transmission opportunities.

Figure 12:
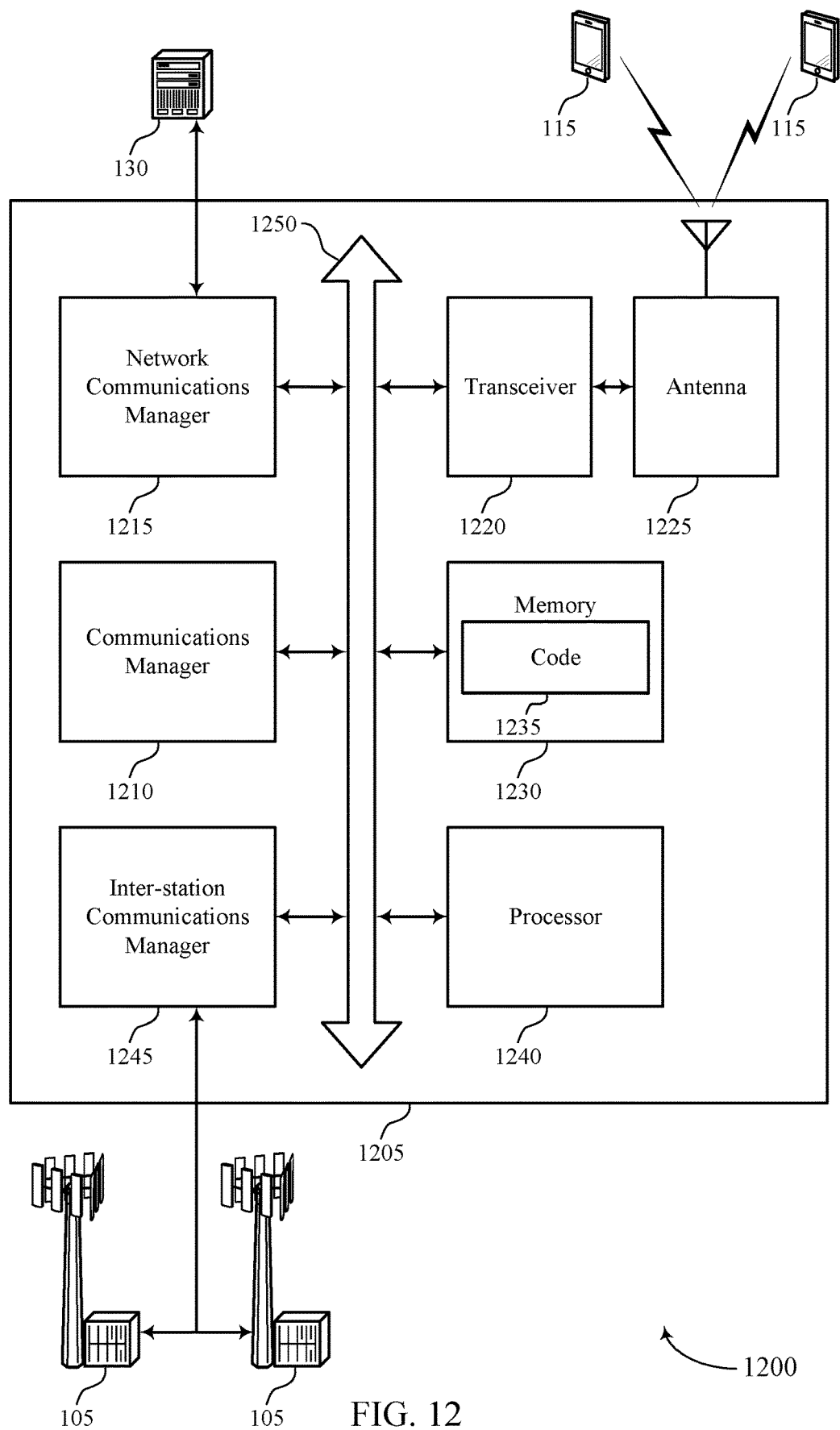
FIG. 12 shows a diagram of a system including a device that supports indication of pause duration for unlicensed band operation in accordance with aspects of the present disclosure.

FIG. 12 shows a diagram of a system 1200 including a device 1205 that supports indication of pause duration for unlicensed band operation in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may determine a set of channel monitoring parameters associated with monitoring an unlicensed frequency spectrum band, the channel monitoring parameters including a length of a pause duration between successive transmission opportunities and transmit signaling, to a UE in wireless communications with the base station, that identifies the set of channel monitoring parameters associated with monitoring the unlicensed frequency spectrum band.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting indication of pause duration for unlicensed band operation).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
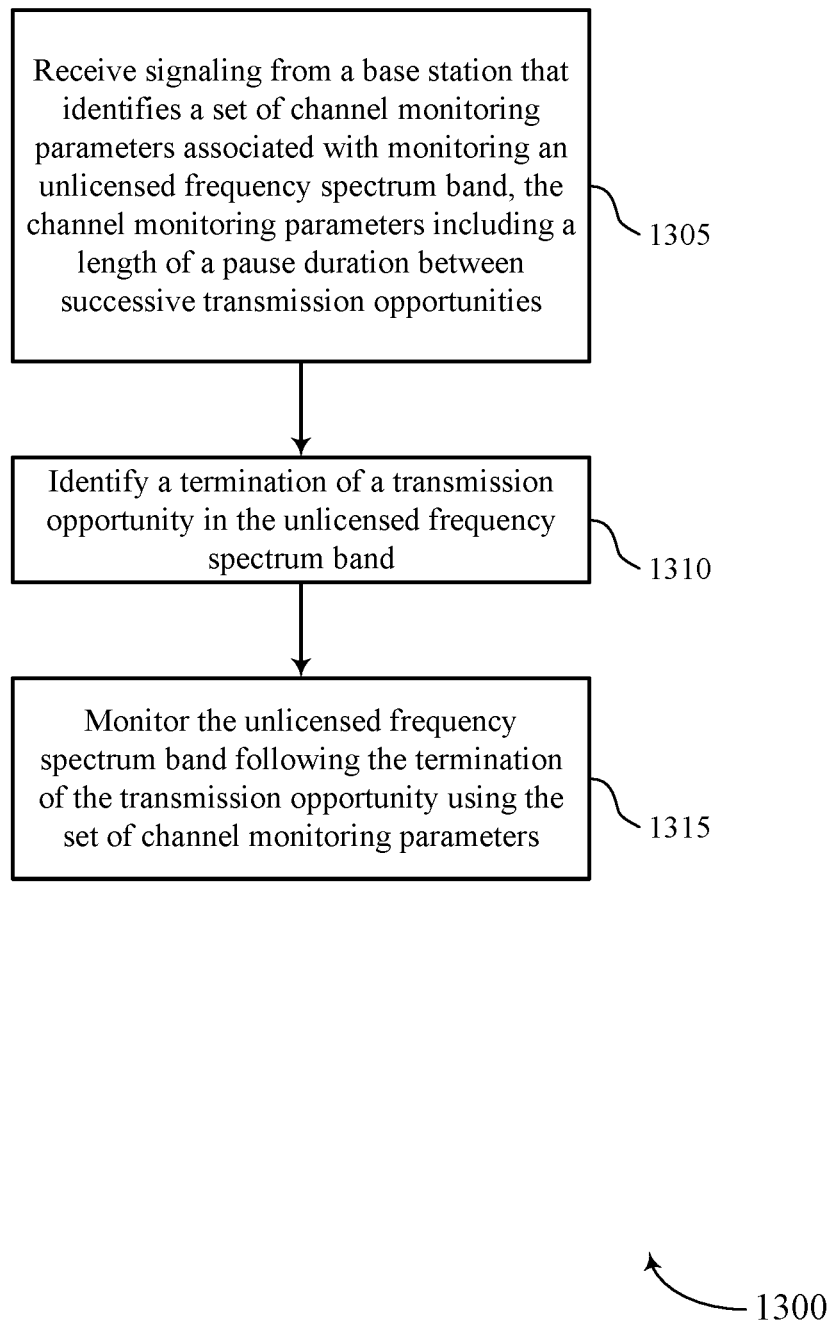
FIGS. 13 through 15 show flowcharts illustrating methods that support indication of pause duration for unlicensed band operation in accordance with aspects of the present disclosure.

FIG. 13 shows a flowchart illustrating a method 1300 that supports indication of pause duration for unlicensed band operation in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive signaling from a base station that identifies a set of channel monitoring parameters associated with monitoring an unlicensed frequency spectrum band, the channel monitoring parameters including a length of a pause duration between successive transmission opportunities. The operations of 1305 may be performed according to the methods described herein. In some examples, aspects of the operations of 1305 may be performed by a channel monitoring parameter manager as described with reference to FIGS. 5 through 8.

At 1310, the UE may identify a termination of a transmission opportunity in the unlicensed frequency spectrum band. The operations of 1310 may be performed according to the methods described herein. In some examples, aspects of the operations of 1310 may be performed by a TxOP timing manager as described with reference to FIGS. 5 through 8.

At 1315, the UE may monitor the unlicensed frequency spectrum band following the termination of the transmission opportunity using the set of channel monitoring parameters. The operations of 1315 may be performed according to the methods described herein. In some examples, aspects of the operations of 1315 may be performed by a channel monitoring manager as described with reference to FIGS. 5 through 8.

Figure 14:
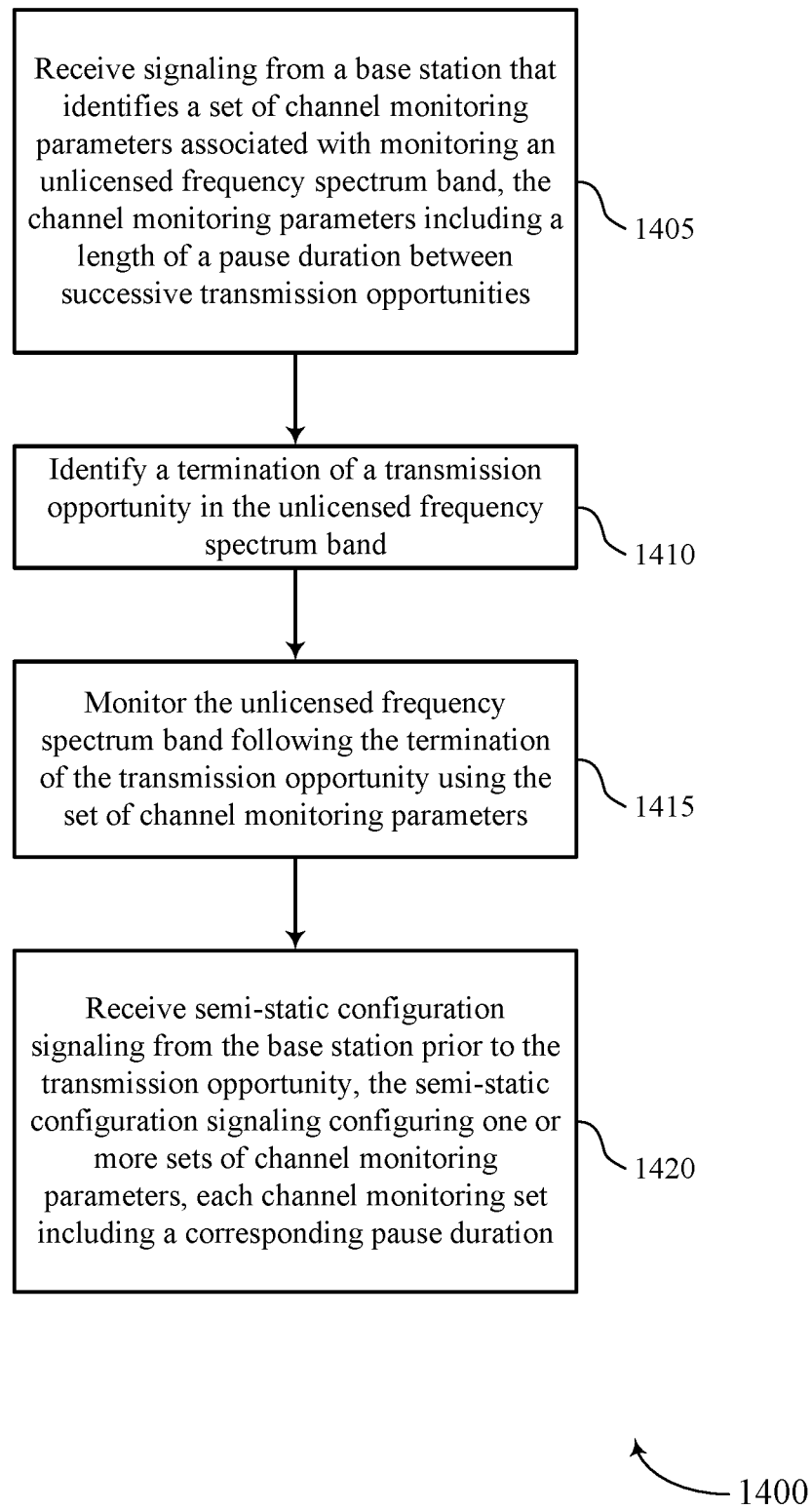

FIG. 14 shows a flowchart illustrating a method 1400 that supports indication of pause duration for unlicensed band operation in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive signaling from a base station that identifies a set of channel monitoring parameters associated with monitoring an unlicensed frequency spectrum band, the channel monitoring parameters including a length of a pause duration between successive transmission opportunities. The operations of 1405 may be performed according to the methods described herein. In some examples, aspects of the operations of 1405 may be performed by a channel monitoring parameter manager as described with reference to FIGS. 5 through 8.

At 1410, the UE may identify a termination of a transmission opportunity in the unlicensed frequency spectrum band. The operations of 1410 may be performed according to the methods described herein. In some examples, aspects of the operations of 1410 may be performed by a TxOP timing manager as described with reference to FIGS. 5 through 8.

At 1415, the UE may monitor the unlicensed frequency spectrum band following the termination of the transmission opportunity using the set of channel monitoring parameters. The operations of 1415 may be performed according to the methods described herein. In some examples, aspects of the operations of 1415 may be performed by a channel monitoring manager as described with reference to FIGS. 5 through 8.

At 1420, the UE may receive semi-static configuration signaling from the base station prior to the transmission opportunity, the semi-static configuration signaling configuring one or more sets of channel monitoring parameters, each channel monitoring set including a corresponding pause duration. The operations of 1420 may be performed according to the methods described herein. In some examples, aspects of the operations of 1420 may be performed by a semi-static channel monitoring configuration manager as described with reference to FIGS. 5 through 8.

Figure 15:
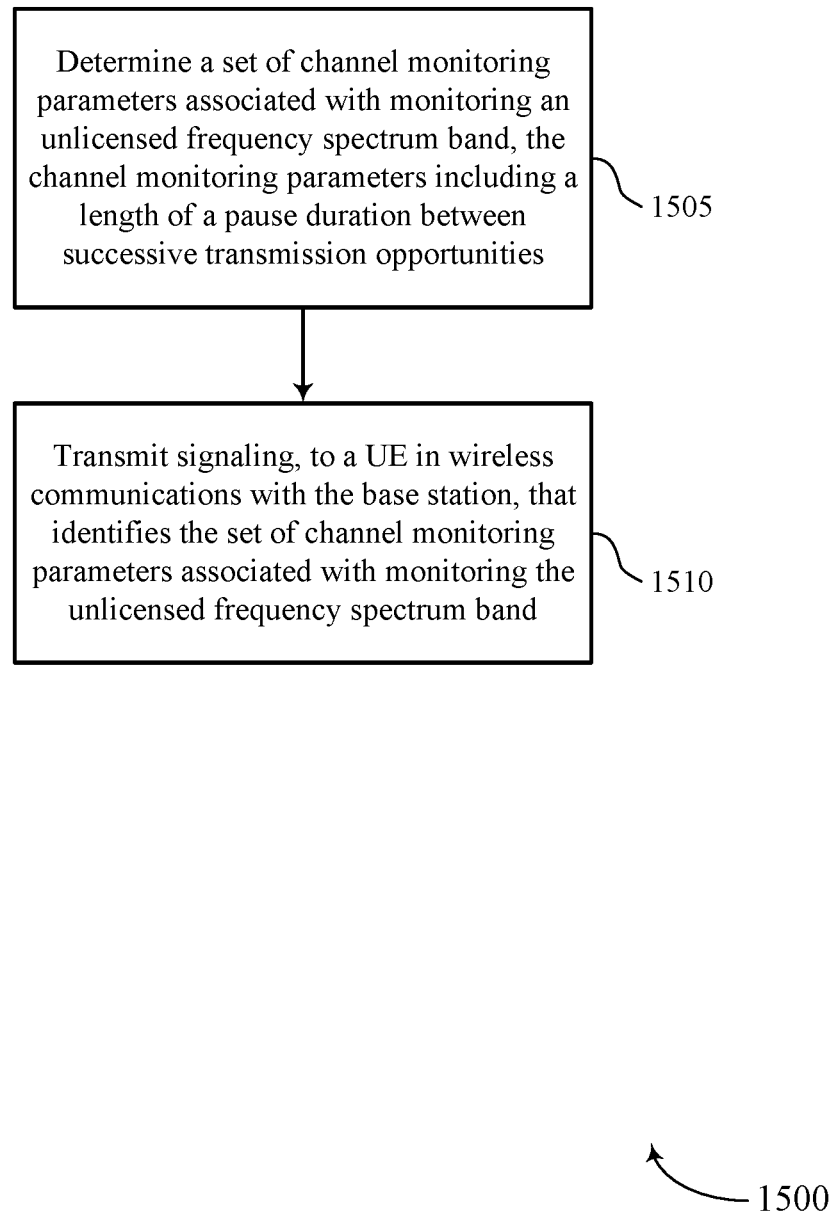

FIG. 15 shows a flowchart illustrating a method 1500 that supports indication of pause duration for unlicensed band operation in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may determine a set of channel monitoring parameters associated with monitoring an unlicensed frequency spectrum band, the channel monitoring parameters including a length of a pause duration between successive transmission opportunities. The operations of 1505 may be performed according to the methods described herein. In some examples, aspects of the operations of 1505 may be performed by a channel monitoring parameter manager as described with reference to FIGS. 9 through 12.

At 1510, the base station may transmit signaling, to a UE in wireless communications with the base station, that identifies the set of channel monitoring parameters associated with monitoring the unlicensed frequency spectrum band. The operations of 1510 may be performed according to the methods described herein. In some examples, aspects of the operations of 1510 may be performed by a channel monitoring signaling manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving semi-static configuration signaling from a base station prior to a transmission opportunity, the semi-static configuration signaling configuring one or more sets of channel monitoring parameters, each channel monitoring set comprising a corresponding pause duration;
   receiving signaling from the base station that identifies a set of channel monitoring parameters associated with monitoring an unlicensed frequency spectrum band, the set of channel monitoring parameters comprising a length of a pause duration between successive transmission opportunities;
   identifying a termination of the transmission opportunity in the unlicensed frequency spectrum band; and
   monitoring the unlicensed frequency spectrum band following the termination of the transmission opportunity using the set of channel monitoring parameters.

2. The method of claim 1, further comprising:
   receiving dynamic signaling during the transmission opportunity that comprises a second set of channel monitoring parameters, the second set of channel monitoring parameters comprising a dynamically indicated pause duration between the transmission opportunity and a next transmission opportunity;
   selecting either the corresponding pause duration from a set of channel monitoring parameters of the one or more sets of channel monitoring parameters or the dynamically indicated pause duration; and
   monitoring the unlicensed frequency spectrum band based at least in part on the selected pause duration between the transmission opportunity and the next transmission opportunity.

3. The method of claim 2, further comprising:
   monitoring, based at least in part on the selected pause duration, the unlicensed frequency spectrum band for a number of successive transmission opportunities.

4. The method of claim 1, further comprising:
   transitioning to a sleep mode for a time period based at least in part on the pause duration.

5. The method of claim 1, wherein the signaling is received from the base station during the transmission opportunity.

6. The method of claim 1, wherein the signaling comprises at least one of: a downlink control information (DCI) signaling, a medium access control (MAC) control element (CE), or a radio resource control (RRC) signaling.

7. The method of claim 1, wherein the signaling comprises at least one of: a common signaling, a group signaling, or a UE-specific signaling.

8. A method for wireless communications at a base station, comprising:
   transmitting semi-static configuration signaling to a user equipment (UE) prior to a transmission opportunity, the semi-static configuration signaling configuring one or more sets of channel monitoring parameters, each channel monitoring set comprising a corresponding pause duration;
   determining a set of channel monitoring parameters associated with monitoring an unlicensed frequency spectrum band, the channel monitoring parameters comprising a length of a pause duration between successive transmission opportunities; and
   transmitting signaling, to the UE in wireless communications with the base station, that identifies the set of channel monitoring parameters associated with monitoring the unlicensed frequency spectrum band.

9. The method of claim 8, further comprising:
   identifying the pause duration based on one or more of a fairness metric associated with communicating on the unlicensed frequency spectrum band, a listen-before-talk (LBT) procedure performed on the unlicensed frequency spectrum band, a traffic metric associated with the unlicensed frequency spectrum band, or a combination thereof.

10. The method of claim 8, further comprising:
transmitting dynamic signaling during the transmission opportunity that comprises a second set of channel monitoring parameters, the second set of channel monitoring parameters comprising a dynamically indicated pause duration between the transmission opportunity and a next transmission opportunity.

11. The method of claim 10, wherein the dynamically indicated pause duration is for a number of successive transmission opportunities.

12. The method of claim 8, wherein the signaling is transmitted to the UE during the transmission opportunity.

13. The method of claim 8, wherein the signaling comprises at least one of: a dynamic control information (DCI) signaling, a medium access control (MAC) control element (CE), or a radio resource control (RRC) signaling.

14. The method of claim 8, wherein the signaling comprises at least one of: a common signaling, a group signaling, or a UE-specific signaling.

15. An apparatus for wireless communications at a user equipment (UE), comprising:
a processor,
memory in electronic communication with the processor; and
instructions stored in the memory and executable by the processor to cause the apparatus to:
receive semi-static configuration signaling from a base station prior to a transmission opportunity, the semi-static configuration signaling configuring one or more sets of channel monitoring parameters, each channel monitoring set comprising a corresponding pause duration;
receive signaling from the base station that identifies a set of channel monitoring parameters associated with monitoring an unlicensed frequency spectrum band, the set of channel monitoring parameters comprising a length of a pause duration between successive transmission opportunities;
identify a termination of the transmission opportunity in the unlicensed frequency spectrum band; and
monitor the unlicensed frequency spectrum band following the termination of the transmission opportunity using the set of channel monitoring parameters.

16. The apparatus of claim 15, wherein the instructions are further executable by the processor to cause the apparatus to:
receive dynamic signaling during the transmission opportunity that comprises a second set of channel monitoring parameters, the second set of channel monitoring parameters comprising a dynamically indicated pause duration between the transmission opportunity and a next transmission opportunity;
select either the corresponding pause duration from a set of channel monitoring parameters of the one or more sets of channel monitoring parameters or the dynamically indicated pause duration; and
monitor the unlicensed frequency spectrum band based at least in part on the selected pause duration between the transmission opportunity and the next transmission opportunity.

17. The apparatus of claim 16, wherein the instructions are further executable by the processor to cause the apparatus to:
monitor, based at least in part on the selected pause duration, the unlicensed frequency spectrum band for a number of successive transmission opportunities.

18. The apparatus of claim 15, wherein the instructions are further executable by the processor to cause the apparatus to:
transition to a sleep mode for a time period based at least in part on the pause duration.

19. The apparatus of claim 15, wherein the signaling is received from the base station during the transmission opportunity.

20. The apparatus of claim 15, wherein the signaling comprises at least one of: a downlink control information (DCI) signaling, a medium access control (MAC) control element (CE), a radio resource control (RRC) signaling, a common signaling, a group signaling, or a UE-specific signaling.

21. An apparatus for wireless communications at a base station, comprising:
a processor,
memory in electronic communication with the processor; and
instructions stored in the memory and executable by the processor to cause the apparatus to:
transmit semi-static configuration signaling to a user equipment (UE) prior to a transmission opportunity, the semi-static configuration signaling configuring one or more sets of channel monitoring parameters, each channel monitoring set comprising a corresponding pause duration;
determine a set of channel monitoring parameters associated with monitoring an unlicensed frequency spectrum band, the channel monitoring parameters comprising a length of a pause duration between successive transmission opportunities; and
transmit signaling, to the UE in wireless communications with the base station, that identifies the set of channel monitoring parameters associated with monitoring the unlicensed frequency spectrum band.

22. The apparatus of claim 21, wherein the instructions are further executable by the processor to cause the apparatus to:
identify the pause duration based on one or more of a fairness metric associated with communicating on the unlicensed frequency spectrum band, a listen-before-talk (LBT) procedure performed on the unlicensed frequency spectrum band, a traffic metric associated with the unlicensed frequency spectrum band, or a combination thereof.

23. The apparatus of claim 21, wherein the instructions are further executable by the processor to cause the apparatus to:
transmit dynamic signaling during the transmission opportunity that comprises a second set of channel monitoring parameters, the second set of channel monitoring parameters comprising a dynamically indicated pause duration between the transmission opportunity and a next transmission opportunity.

24. The apparatus of claim 23, wherein the dynamically indicated pause duration is for a number of successive transmission opportunities.

25. The apparatus of claim 21, wherein the signaling is transmitted to the UE during the transmission opportunity.

26. The apparatus of claim 21, wherein the signaling comprises at least one of: a dynamic control information (DCI) signaling, a medium access control (MAC) control element (CE), a radio resource control (RRC) signaling, a common signaling, a group signaling, or a UE-specific signaling.

\* \* \* \* \*